(12) United States Patent
Kowalski et al.

(10) Patent No.: US 12,417,575 B2
(45) Date of Patent: Sep. 16, 2025

(54) DYNAMIC 3D SCENE GENERATION

(71) Applicant: Microsoft Technology Licensing, LLC, Redmond, WA (US)

(72) Inventors: Marek Adam Kowalski, Komorow (PL); Stephan Joachim Garbin, London (GB); Virginia Estellers Casas, Bern (CH); Julien Pascal Christophe Valentin, Zurich (CH); Kacper Kania, Warsaw (PL)

(73) Assignee: Microsoft Technology Licensing, LLC., Redmond, WA (US)

( * ) Notice: Subject to any disclaimer, the term of this patent is extended or adjusted under 35 U.S.C. 154(b) by 257 days.

(21) Appl. No.: 18/164,538

(22) Filed: Feb. 3, 2023

(65) Prior Publication Data

US 2024/0265610 A1    Aug. 8, 2024

(51) Int. Cl.
*G06T 13/20* (2011.01)
*G06N 3/08* (2023.01)
(Continued)

(52) U.S. Cl.
CPC .............. *G06T 13/40* (2013.01); *G06N 3/08* (2013.01); *G06T 15/06* (2013.01); *G06T 15/08* (2013.01);
(Continued)

(58) Field of Classification Search
CPC ......... G06T 13/40; G06T 15/06; G06T 15/08; G06T 19/20; G06T 2219/2012;
(Continued)

(56) References Cited

U.S. PATENT DOCUMENTS

2011/0149340 A1* 6/2011 Lipman .................. G06T 19/20
358/1.15
2015/0029198 A1* 1/2015 Sumner .................. G06T 19/20
345/474
(Continued)

OTHER PUBLICATIONS

Xu, T., Harada, T. (2022). Deforming Radiance Fields with Cages. In: Avidan, S., Brostow, G., CisséÃ©, M., Farinella, G.M., Hassner, T. (eds) Computer Vision â ECCV 2022. ECCV 2022. Lecture Notes in Computer Science, vol. 13693. Springer, Cham. https://doi.org/10.1007/978-3-031-19827-4_10 (Year: 2022).*

(Continued)

*Primary Examiner* — Xiao M Wu
*Assistant Examiner* — George Renze
(74) *Attorney, Agent, or Firm* — Barta Jones, PLLC

(57) ABSTRACT

A cage of primitive 3D elements and associated animation data is received. Compute a ray from a virtual camera through a pixel into the cage animated according to the animation data and compute a plurality of samples on the ray. Compute a transformation of the samples into a canonical cage. For each transformed sample, query a plurality of learnt radiance field parameterizations, each learnt on a different deformed state of the 3D scene to obtain color values for each learnt radiance field. For each transformed sample, query a learnt radiance field parameterization of the 3D scene to obtain an opacity value. Compute, for each transformed sample, a weighted combination of the color values, wherein the weights are related to the local features. A volume rendering method is applied to the weighted combinations of the color and the opacity values producing a pixel value.

20 Claims, 10 Drawing Sheets

(51) Int. Cl.
    *G06T 13/40* (2011.01)
    *G06T 15/06* (2011.01)
    *G06T 15/08* (2011.01)
    *G06T 15/20* (2011.01)
    *G06T 19/20* (2011.01)

(52) U.S. Cl.
    CPC ...... *G06T 19/20* (2013.01); *G06T 2219/2012* (2013.01); *G06T 2219/2016* (2013.01); *G06T 2219/2021* (2013.01)

(58) Field of Classification Search
    CPC ..... G06T 2219/2016; G06T 2219/2021; G06T 13/20; G06T 15/20; G06N 3/08
    See application file for complete search history.

(56) References Cited

U.S. PATENT DOCUMENTS

| | | | |
|---|---|---|---|
| 2017/0018121 A1* | 1/2017 | Lawson | G06V 40/10 |
| 2022/0239844 A1* | 7/2022 | Lv | G06T 15/205 |
| 2022/0383113 A1* | 12/2022 | Okabe | G06N 3/0464 |

OTHER PUBLICATIONS

Zhuang, et al., "Mo-FaNeRF: Morphable Facial Neural Radiance Field", In Repository of arXiv:2112.02308v1, Dec. 4, 2021, pp. 1-15.
Tewari, et al., "Advances in Neural Rendering", In Journal of Computer Graphics Forum, vol. 41, Issue 2, May 24, 2022, pp. 703-735.
Tretschk, et al., "Non-Rigid Neural Radiance Fields: Reconstruction and Novel View Synthesis of a Dynamic Scene From Monocular Video", In Proceedings of the IEEE/CVF International Conference on Computer Vision, Oct. 10, 2021, pp. 12939-12950.
Verbin, et al., "Ref-NeRF: Structured View-dependent Appearance for Neural Radiance Fields", In Proceedings of IEEE/CVF Conference on Computer Vision and Pattern Recognition, Jun. 18, 2022, pp. 5481-5490.
Vicini, et al., "Non-Exponential Transmittance Model for Volumetric Scene Representations", In Journal of ACM Transactions on Graphics, vol. 40, Issue 4, Jul. 19, 2021, 16 Pages.
Wang, et al., "Clip-Nerf: Text-And-Image Driven Manipulation of Neural Radiance Fields", In Proceedings of IEEE/CVF Conference on Computer Vision and Pattern Recognition, Jun. 18, 2022, pp. 3825-3834.
Wang, et al., "Fourier Plenoctrees for Dynamic Radiance Field Rendering in Real-Time", In Proceedings of IEEE/CVF Conference on Computer Vision and Pattern Recognition, Jun. 18, 2022, pp. 13514-13524.
Wang, et al., "MoRF: Morphable Radiance Fields for Multiview Neural Head Modeling", In Proceedings of ACM SIGGRAPH Conference, Jul. 27, 2022, 9 Pages.
Wang, et al., "Multiscale Structural Similarity for Image Quality Assessment", In Proceedings of the Thrity-Seventh Asilomar Conference on Signals, Systems and Computers, Nov. 9, 2003, pp. 1398-1402.
Weng, et al., "HumanNeRF: Free-viewpoint Rendering of Moving People From Monocular Video", In proceedings of IEEE/CVF Conference on Computer Vision and Pattern Recognition, Jun. 18, 2022, pp. 16189-16199.
Wood, et al., "3D Face Reconstruction With Dense Landmarks", In Repository of arXiv:2204.02776v2, Jul. 20, 2022, 24 Pages.
Wood, et al., "Fake It Till You Make It: Face Analysis in the Wild Using Synthetic Data Alone", In Proceedings IEEE/CVF International Conference on Computer Vision, Oct. 10, 2021, pp. 3661-3671.
Wuu, et al., "Multiface: A Dataset for Neural Face Rendering", In Repository of arXiv:2207.11243v1, Jul. 22, 2022, 10 Pages.
Xian, et al., "Space-time Neural Irradiance Fields for Free-viewpoint Video", In Proceedings of IEEE/CVF Conference on Computer Vision and Pattern Recognition, Jun. 20, 2021, pp. 9416-9426.
Xiangli, et al., "CityNeRF: Building NeRF at City Scale", In Repository of arXiv:2112.05504v2, Dec. 17, 2021, 10 Pages.
Xu, et al., "Deforming Radiance Fields With Cages", In Proceedings of 17th European Conference on Computer Vision, Oct. 23, 2022, 17 Pages.
Xu, et al., "Houdini Engine: Evolution Towards a Procedural Pipeline", In Proceedings of the Fourth Symposium on Digital Production, Aug. 9, 2014, pp. 13-18.
Yu, et al., "Plenoctrees for Real-Time Rendering of Neural Radiance Fields", In Proceedings of the IEEE/CVF International Conference on Computer Vision 2021, Oct. 10, 2021, pp. 5732-5741.
Yuan, et al., "NeRF-Editing: Geometry Editing of Neural Radiance Fields", In Proceedings of the IEEE/CVF Conference on Computer Vision and Pattern Recognition, Jun. 18, 2022, pp. 18332-18343.
Zhang, et al., "AvatarGen: A 3D Generative Model for Animatable Human Avatars", In Repository of arXiv:2211.14589v1, Nov. 26, 2022, pp. 1-19.
Zhang, et al., "Nerf++: Analyzing and Improving Neural Radiance Fields", In Repository of arXiv:2010.07492v2, Oct. 21, 2020, pp. 1-9.
Zhang, et al., "The Unreasonable Effectiveness of Deep Features as a Perceptual Metric", In Proceedings of IEEE/CVF Conference on Computer Vision and Pattern Recognition, Jun. 18, 2018, pp. 586-595.
Zhao, et al., "HumanNeRF: Efficiently Generated Human Radiance Field From Sparse Inputs", In Proceedings of IEEE/CVF Conference on Computer Vision and Pattern Recognition, Jun. 18, 2022, pp. 7733-7743.
Lombardi, et al., "Mixture of volumetric primitives for efficient neural rendering", In ACM Transactions on Graphics (TOG), vol. 40, Issue 4, Aug. 2021, 13 Pages.
Müller, et al., "Instant Neural Graphics Primitives with a Multiresolution Hash Encoding", In Journal of ACM Transactions on Graphics, vol. 41, No. 4, Jul. 2022, 15 Pages.
Zielonka, et al., "Instant Volumetric Head Avatars", In Repository of the arXiv:2211.12499v1, Nov. 22, 2022, 16 Pages.
Xu, et al., "ManVatar: Fast 3D Head Avatar Reconstruction Using Motion-Aware Neural Voxels", In Repository of arXiv:2211.13206v1, Nov. 23, 2022, 10 Pages.
Kania, et al., "BlendFields: Few-Shot Example-Driven Facial Modeling", In Repository of arXiv:2305.07514v1, May 12, 2023, 16 Pages.
Hong, et al.,"HeadNeRF: A Real-time NeRF-based Parametric Head Model," arXiv, Apr. 30, 2022, pp. 20374-20384.
International Search Report and Written Opinion received for PCT Application No. PCT/US24/13621, Jun. 26, 2024, 13 pages.
Peng, et al.,"Animatable Neural Radiance Fields for Modeling Dynamic Human Bodies," arXiv, Oct. 7, 2021, pp. 14314-14323.
Athar, et al., "RigNeRF: Fully Controllable Neural 3D Portraits", In Proceedings of the IEEE/CVF Conference on Computer Vision and Pattern Recognition, Jun. 18, 2022, pp. 20332-20341.
Attal, et al., "Törf: Time-Of-Flight Radiance Fields for Dynamic Scene View Synthesis", In Proceedings of 35th Conference on Neural Information Processing Systems, Dec. 6, 2021, 13 Pages.
Avcibas, et al., "Statistical Evaluation of Image Quality Measures", In Journal of Electronic Imaging, vol. 11, Issue 2, Apr. 2002, pp. 206-223.
Yang, et al., "NeuMesh: Learning Disentangled Neural Mesh-based Implicit Field for Geometry and Texture Editing", In Proceedings of 17th European Conference on Computer Vision, Oct. 23, 2022, 19 Pages.
Barron, et al., "Mip-NeRF 360: Unbounded Anti-aliased Neural Radiance Fields", In Proceedings of the IEEE/CVF Conference on Computer Vision and Pattern Recognition, Jun. 18, 2022, pp. 5460-5469.
Barron, et al., "Mip-NeRP: A Multiscale Representation for Anti-aliasing Neural Radiance Fields", In Proceedings of the IEEE/CVF International Conference on Computer Vision, Oct. 10, 2021, pp. 5835-5844.

(56) References Cited

OTHER PUBLICATIONS

Blanz, et al., "A Morphable Model for the Synthesis of 3D Faces", In Proceedings of the 26th Annual Conference on Computer Graphics and Interactive Techniques, Jul. 1, 1999, pp. 187-194.
Cao, et al., "Authentic Volumetric Avatars From a Phone Scan", In Journal of ACM Transactions on Graphics, vol. 41, Issue 4, Jul. 22, 2022, 19 Pages.
Cheng, et al., "Cross-Modal 3D Shape Generation and Manipulation", In Repository of arXiv:2207.11795v1, Jul. 24, 2022, pp. 1-24.
Zhi, et al., "Dual-Space Nerf: Learning Animatable Avatars and Scene Lighting in Separate Spaces", In Repository of arXiv:2208.14851v1, Aug. 31, 2022, 13 Pages.
Cook, Shane, "CUDA Programming: A Developer's Guide to Parallel Computing with GPUs", In Publication of Morgan Kaufmann Publishers Inc, Nov. 13, 2012, 592 Pages.
Desbrun, et al., "Implicit Fairing of Irregular Meshes Using Diffusion and Curvature Flow", In Proceedings of the 26th Annual Conference on Computer Graphics and Interactive Techniques, Jul. 1, 1999, pp. 317-324.
Gafni, et al., "Dynamic Neural Radiance Fields for Monocular 4D Facial Avatar Reconstruction", In Proceedings of the IEEE/CVF Conference on Computer Vision and Pattern Recognition, Jun. 20, 2021, pp. 8649-8658.
Gao, et al., "Reconstructing Personalized Semantic Facial NeRF Models From Monocular Video", In Journal of ACM Transactions on Graphics, vol. 41, Issue 6, Dec. 2022, 12 Pages.
Garbin, et al., "Fastnerf: High-Fidelity Neural Rendering at 200fps", In Proceedings of IEEE/CVF International Conference on Computer Vision, Oct. 10, 2021, pp. 14346-14355.
Garbin, et al., "Voltemorph: Realtime, Controllable and Generalisable Animation of Volumetric Representations", In Repository of arXiv:2208.00949v1, Aug. 1, 2022, pp. 1-18.
Grassal, et al., "Neural Head Avatars From Monocular RGB Videos", In Proceedings of the IEEE/CVF Conference on Computer Vision and Pattern Recognition, Jun. 18, 2022, pp. 18653-18664.
Hedman, et al., "Baking Neural Radiance Fields for Real-Time View Synthesis", In Proceedings of the IEEE/CVF International Conference on Computer Vision, Oct. 10, 2021, pp. 5875-5884.
Huang, et al., "HDR-NeRF: High Dynamic Range Neural Radiance Fields", In Proceedings of IEEE/CVF Conference on Computer Vision and Pattern Recognition, Jun. 18, 2022, pp. 18377-18408.
Ichim, et al., "Dynamic 3D Avatar Creation From Hand-Held Video Input", In Journal of ACM Transactions on Graphics, vol. 34, Issue 4, Jul. 27, 2015, 14 Pages.
Irving, et al., "Invertible Finite Elements for Robust Simulation of Large Deformation", In Proceedings of the ACM SIGGRAPH/Eurographics symposium on Computer animation, Aug. 27, 2004, 11 pages.
Jiang, et al., "Neuman: Neural Human Radiance Field From a Single Video", In Repository of arXiv:2203.12575v2, Sep. 22, 2022, pp. 1-21.
Kania, et al., "CoNeRF: Controllable Neural Radiance Fields", In Proceedings of IEEE/CVF Conference on Computer Vision and Pattern Recognition, Jun. 18, 2022, pp. 18602-18611.
Kim, et al., "AE-NeRF: Auto-Encoding Neural Radiance Fields for 3D-Aware Object Manipulation", In Repository of arXiv:2204.13426v1, Apr. 28, 2022, pp. 1-14.
Kingma, et al., "Adam: A Method for Stochastic Optimization", In Proceedings of 3rd International Conference on Learning Representations, May 7, 2015, 17 Pages.
Lewis, et al., "Practice and Theory of Blendshape Facial Models", In Journal of Eurographics (State of the Art Reports), vol. 1, Issue 8, Apr. 2014, 20 Pages.
Li, et al., "Learning a Model of Facial Shape and Expression From 4D Scans", In Journal of ACM Transactions on Graphics, vol. 36, Issue 6, Nov. 1, 2017, 17 Pages.
Liu, et al., "Editing Conditional Radiance Fields", In Proceedings of IEEE/CVF International Conference on Computer Vision, Oct. 10, 2021, pp. 5773-5783.
Liu, et al., "Neural Sparse Voxel Fields", In Journal of Advances in Neural Information Processing Systems, vol. 33, Dec. 6, 2020, 13 Pages.
Lombardi, et al., "Neural Volumes Learning Dynamic Renderable Volumes From Images", In Journal of ACM Transactions on Graphics, vol. 38, Issue 4, Jul. 12, 2019, 3 Pages.
Ma, et al., "Pixel Codec Avatars", In Proceedings of the IEEE/CVF Conference on Computer Vision and Pattern Recognition, Jun. 20, 2021, pp. 64-73.
Martin-Brualla, et al., "Nerf in the Wild: Neural Radiance Fields for Unconstrained Photo Collections", In Proceedings IEEE/CVF Conference on Computer Vision and Pattern Recognition, Jun. 20, 2021, pp. 7210-7219.
Mihajlovic, et al., "Keypointnerf: Generalizing Image-Based Volumetric Avatars Using Relative Spatial Encoding of Keypoints", In Proceedings of 17th European Conference on Computer Vision, Oct. 31, 2022, pp. 179-197.
Mildenhall, et al., "Nerf in the Fark: High Dynamic Range View Synthesis From Noisy Raw Images", In Proceedings of IEEE/CVF Conference on Computer Vision and Pattern Recognition, Jun. 18, 2022, pp. 16169-16178.
Mildenhall, et al., "NeRF: Representing Scenes as Neural Radiance Fields for View Synthesis", In Proceedings of European Conference on Computer Vision, Aug. 29, 2020, pp. 1-17.
Molino, et al., "Tetrahedral Mesh Generation for Deformable Bodies", In Proceedings of Symposium on Computer Animation, vol. 8, Jul. 26, 2003, 8 Pages.
Blender: a 3D Modelling and Rendering Package, Retrieved From : https://www.systutorials.com/docs/linux/man/1-blender/, Retrieved Date : Jun. 26, 2023, 9 Pages.
Noguchi, et al., "Watch It Move: Unsupervised Discovery of 3D Joints for Re-Posing of Articulated Objects", In Proceedings of the IEEE/CVF Conference on Computer Vision and Pattern Recognition, Jun. 18, 2022, pp. 3677-3687.
Oat, Christopher, "Animated Wrinkle Maps", In ACM SIGGRAPH courses, Aug. 5, 2007, pp. 33-37.
Park, et al., "Hypernerf: A Higherdimensional Representation for Topologically Varying Neural Radiance Fields", In Journal of ACM Transactions on Graphics, vol. 40, Issue 6, Dec. 10, 2021, 12 Pages.
Park, et al., "Nerfies: Deformable Neural Radiance Fields", In Proceedings of the IEEE/CVF International Conference on Computer Vision, Oct. 10, 2021, pp. 5865-5874.
Pumarola, et al., "D-Nerf: Neural Radiance Fields for Dynamic Scenes", In Proceedings of the IEEE/CVF Conference on Computer Vision and Pattern Recognition, Jun. 20, 2021, pp. 10318-10327.
Raman, et al., "Mesh-Tension Driven Expression-Based Wrinkles for Synthetic Faces", In Proceedings of IEEE/CVF Winter Conference on Applications of Computer Vision, Jan. 2, 2023, pp. 3504-3514.
Rematas, et al., "Urban Radiance Fields", In Proceedings of IEEE/CVF Conference on Computer Vision and Pattern Recognition, Jun. 18, 2022, pp. 12922-12932.
Rombach, et al., "High-Resolution Image Synthesis With Latent Diffusion Models", In Proceedings IEEE/CVF Conference on Computer Vision and Pattern Recognition, Jun. 18, 2022, pp. 10684-10695.
Suhail, et al., "Light Field Neural Rendering", In Proceedings of IEEE/CVF Conference on Computer Vision and Pattern Recognition, Jun. 18, 2022, pp. 8259-8269.
Sun, et al., "Direct Voxel Grid Optimization: Super-fast Convergence for Radiance Fields Reconstruction", In Proceedings of IEEE/CVF Conference on Computer Vision and Pattern Recognition, Jun. 18, 2022, pp. 5449-5459.
Sun, et al., "FENeRF: Face Editing in Neural Radiance Fields", In Proceedings of IEEE/CVF Conference on Computer Vision and Pattern Recognition, Jun. 18, 2022, pp. 7672-7682.
Tagliasacchi, et al., "Volume Rendering Digest (for NeRF)", In Repository of arXiv:2209.02417v1, Aug. 29, 2022, pp. 1-3.
Tancik, et al., "Block-NeRF: Scalable Large Neural View Synthesis", In Proceedings of IEEE/CVF Conference on Computer Vision and Pattern Recognition, Jun. 18, 2022, pp. 8238-8248.

* cited by examiner

302

300

DYNAMIC 3D SCENE GENERATION

BACKGROUND

A dynamic scene is an environment in which one or more objects are moving; in contrast to a static scene where all objects are stationary. An example of a dynamic scene is a person's face which moves as the person talks. Another example of a dynamic scene is a propellor of an aircraft which is rotating. Another example of a dynamic scene is a standing person with moving arms. Another example of a dynamic scene is a rubber cylinder which twists.

In traditional computer graphics, computing synthetic images of dynamic scenes that capture fine-grained detail is a complex task since a complex rigged three-dimensional (3D) model of the scene and its dynamics is needed. Obtaining such a rigged 3D model is complex and time consuming and involves manual work.

Synthetic images of dynamic scenes are used for a variety of purposes such as computer games, films, video communications and more.

The embodiments described below are not limited to implementations which solve any or all of the disadvantages of known apparatus for computing synthetic images of dynamic scenes.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a way of computing images of dynamic scenes in a realistic i.e. depicting fine-grained features, and in a controllable way, so that a user or an automated process is able to easily control how the dynamic scene animates. Optionally, the images are computed in real time (such as at 30 frames per second or more) and are photorealistic, that is the images have characteristics generally matching those of empirical images and/or video.

In various examples there is a computer-implemented method of computing an image of a dynamic 3D scene comprising a 3D object. The method comprises receiving a description of a deformation of the 3D object, the description comprising a cage of primitive 3D elements and associated animation data from a physics engine or an articulated object model. For a pixel of the image, the method computes a ray from a virtual camera through the pixel into the cage animated according to the animation data and computes a plurality of samples on the ray. Each sample is a 3D position and view direction in one of the 3D elements. The method computes a transformation of the samples into a canonical version of the cage to produce transformed samples and local features describing the volume change between canonical and non-canonical states of the cage. For each transformed sample, the method queries a plurality of learnt radiance field parameterizations of the 3D scene, each learnt on a different deformed state of the scene, to obtain a color value from each learnt radiance field. Additionally, the method queries a learnt radiance field parameterization of the 3D scene to obtain an opacity value. The method computes, for each transformed sample, a weighted combination of the color values, where the weights are related to the local features. A volume rendering method is applied to the weighted combinations of the color values and the opacity values to produce a pixel value of the image.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
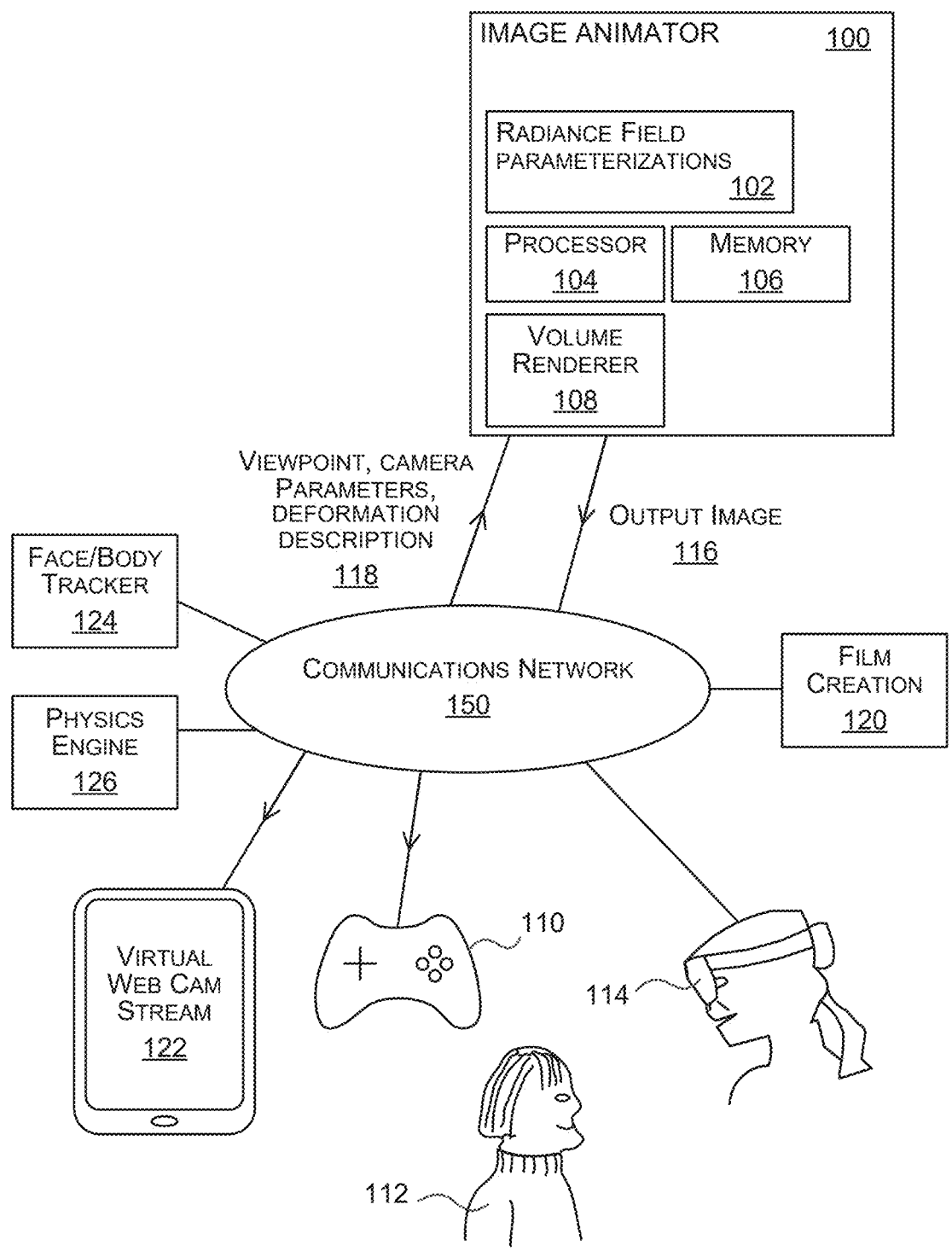
FIG. 1 is a schematic diagram of an image animator for computing images of controllable dynamic scenes.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

The technology described herein uses radiance fields and volume rendering methods. Radiance field parameterizations represent a radiance field which is a function from five-dimensional (5D) space to four-dimensional (4D) space (referred to as a field) where values of radiance are known for each pair of 3D point and 2D viewpoint in the field. A radiance value is made up of a color value and an opacity value. In various examples, a radiance field parameterization is a trained machine learning model such as a neural network, support vector machine, random decision forest or other machine learning model which learns an association between radiance values and pair of 3D points and viewpoints. In various examples, the viewpoints correspond to view directions. In various examples, a radiance field parametrization is a cache of associations between radiance values and 3D points, where the associations are obtained from a trained machine learning model. In various examples, the trained machine learning model is trained using training data comprising images of a dynamic scene from a plurality of viewpoints.

Volume rendering methods compute an image from a radiance field for a particular camera viewpoint by examining radiance values of points along rays which form the image. Volume rendering software is well known and commercially available.

As mentioned above, synthetic images of dynamic scenes are used for a variety of purposes such as computer games, films, video communications, telepresence and others. However, it is difficult to generate synthetic images of dynamic scenes in a way that reproduces fine-grained features that would be present in an actual dynamic scene, and in a controllable way; that is, to be able to easily and precisely control how the scene animates. Precise control and fine-grained features are desired for many applications such as where synthetic images of an avatar of a person in a video call are to accurately depict the facial expression of the real person. Precise control is also desired for video game applications where an image of a particular chair is to be made to shatter in a realistic manner or where a cylinder of rubber material is to be made to twist in a realistic manner. These examples of the video call and video game are not intended to be limiting but rather to illustrate uses of the present technology. In various examples, the technology is used to capture any scene which is static or dynamic such as objects, vegetation environments, humans or other scenes.

Fine-grained features are defined herein as subtle features that are not reproduced by a coarse model, such as a 3DMM face model. In various examples, fine-grained features include wrinkles and/or dimples on the face of a person. In various examples, fine-grained features include wrinkles in the material of an object.

Enrollment is another problem that arises when generating synthetic images of dynamic scenes. Enrollment is where a radiance field parameterization is created for a particular 3D scene, such as a particular person or a particular chair. Some approaches to enrollment use large quantities of training images depicting the particular 3D scene over time and from different viewpoints. Where enrollment is time consuming and computationally burdensome difficulties arise.

Being able to generate synthetic images of dynamic scenes in real time, such as during a video call where an avatar of a caller is to be created, is increasingly relevant. However, due to the complex computation and computational burden, it is difficult to achieve real time operation.

Generalization ability is an ongoing issue. It often difficult for trained radiance field parameterizations to be able to generalize so as to facilitate computing images of a 3D scene which differ from those images used during training of the radiance field parameterization.

Alternative approaches using implicit deformation methods based on learned functions are 'black boxes' to content creators, they require large amounts of training data to generalize meaningfully, and they do not produce realistic extrapolations outside the training data.

The present technology provides a precise way to control how images of dynamic scenes animate and an accurate way to produce fine-grained features in images. A user, or an automated process, is able to specify parameter values such as volumetric blendshapes and skeleton values which are applied to a cage of primitive 3D elements. In this way the user or automated process is able to precisely control deformation of a 3D object to be depicted in a synthetic image. In other examples, a user of an automated process is able to use animation data from a physics engine to precisely control deformation of the 3D object to be depicted in the synthetic image. A blendshape is a mathematical function which when applied to a parameterized 3D model changes parameter values of the 3D model. In various examples, where the 3D model is of a person's head there is several hundred blendshapes, each blendshape changing the 3D model according to a facial expression or an identity characteristic.

The present technology further provides a way to produce fine-grained features on images created of a dynamic scene using only a limited amount of training data.

Alternative approaches of increasing the control of images of a scene have limited resolution or require large amounts of training data as they rely on controllable coarse models of the scene or a conditioning signal.

Alternative approaches built on an explicit model are more accessible as they require less training data, but are limited by the model's resolution.

The methods described herein use a limited amount of training data to learn details missing in a coarse model, while allowing the control provided by a controllable model. Missing details corresponds to details that are not present in a coarse model but that are present on the actual subject that the model is designed to represent.

The present technology reduces the burden of enrollment in some examples. Enrollment burden is reduced by using a reduced amount of training images, such as training image frames from only one or only two time instants.

The present technology is able to operate in real time (such as at 30 frames per second or more) in some examples. This is achieved by using optimizations when computing a transform of sample points to a canonical space used by the radiance field parameterization.

The present technology operates with good generalization ability in various examples. By creating a scene animatable with parameters from a chosen face model or physics engines and blending fine-grained features to produce missing details in a chosen model, the technology uses the model dynamics from the face model or physics engine to animate the scene beyond the training data in a physically meaningful and realistic way to generalize well.

FIG. 1 is a schematic diagram of an image animator 100 for computing synthetic images of dynamic scenes. In various examples, the image animator 100 is deployed as a web service. In various examples, the image animator 100 is deployed at a personal computer or other computing device which is in communication with a head worn computer 114 such as a head mounted display device. In various examples, the image animator 100 is deployed in a companion computing device of head worn computer 114.

The image animator 100 comprises radiance field parametrizations 102, at least one processor 104, a memory 106 and a volume renderer 108. In various examples, a radiance field parametrization of the radiance field parametrizations 102 is a neural network, or a random decision forest, or a support vector machine or other type of machine learning model. It has been trained to predict pairs of color and opacity values of three-dimensional points and viewpoints in a canonical space of a dynamic scene and more detail about the training process is given later in this document. In various examples, the radiance field parametrizations 102 are each a cache storing associations between three dimensional points in the canonical space and color and opacity values. In various examples, the radiance field parametrizations are each obtained by querying a machine learning model trained using training data comprising images of the dynamic scene from a plurality of viewpoints. In various examples, the viewpoints correspond to view directions.

The volume renderer 108 is a well-known computer graphics volume renderer which takes pairs of color and opacity values of three-dimensional points along rays and computes an output image 116.

The image animator 100 is configured to receive queries from client devices such as smart phone 122, computer game apparatus 110, head worn computer 114, film creation apparatus 120 or different client device. The queries are sent from the client devices over a communications network 150 to the image animator 100.

A query from a client device comprises a specified viewpoint of a virtual camera, specified values of intrinsic parameters of the virtual camera and a deformation description 118. A synthetic image is to be computed by the image animator 100 as if it had been captured by the virtual camera. The deformation description describes desired dynamic content of the scene in the output image 116.

The image animator 100 receives a query and in response generates a synthetic output image 116 which it sends to the client device. The client device uses the output image 116 for one of a variety of useful purposes including but not limited to: generating a virtual webcam stream, generating video of a computer video game, generating a hologram for display by a mixed-reality head worn computing device, generating a film. The image animator 100 is able to compute synthetic images of a dynamic 3D scene, for particular specified desired dynamic content and particular specified viewpoints, on demand. In an example, the dynamic scene is a face of a talking person. The image animator 100 is able to compute synthetic images of the face from a plurality of viewpoints and with any specified dynamic content. Non-limiting examples of specified viewpoints and dynamic content are plan view, eyes shut, face tilted upwards, smile; perspective view, eyes open, mouth open, angry expression. Note that the image animator 100 is able to compute synthetic images for viewpoints and deformation descriptions which were not present in training data used to train the radiance field parameterizations 102 since the machine learning used to create the radiance field parameterizations 102 is able to generalize. Other examples of dynamic scenes are given with reference to FIG. 2, FIG. 3A and FIG. 3B below and include generic objects such as chairs, cars, trees, full human bodies. By using the deformation description, it is possible to control the dynamic scene content depicted in the generated synthetic image. The deformation description is obtained using a physics engine 126 in various examples so that a user or an automated process is able to apply physics rules to shatter a 3D object depicted in the synthetic output image 116 or to apply other physics rules to depict animations such as bouncing, waving, rocking, dancing, rotating, spinning or other animations. It is possible to use a Finite Element Method to apply physical simulations to a cage of 3D primitive elements to create the deformation description such as to produce elastic deformation or shattering. The deformation description is obtained using a face or body tracker 124 in various examples such as where an avatar of a person is being created. By selecting the viewpoint and the intrinsic camera parameter values it is possible to control characteristics of the synthetic output image.

The image animator operates in an unconventional manner to enable realistic synthetic images of dynamic scenes to be generated in a controllable manner, without an explicit model and using limited training data. Many alternative methods of using machine learning to generate synthetic images have little or no ability to control content depicted in the synthetic images which are generated, do not model fine-grained features, or use large amounts of training data.

The image animator 100 improves the functioning of the underlying computing device by enabling realistic synthetic images of dynamic scenes to be computed in a manner whereby the content and viewpoint of the dynamic scene is controllable, without requiring an explicit model and using limited training data.

Alternatively, or in addition, the functionality of the image animator 100 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

In other examples the functionality of the image animator 100 is located at a client device or is shared between a client device and the cloud.

Figure 2:
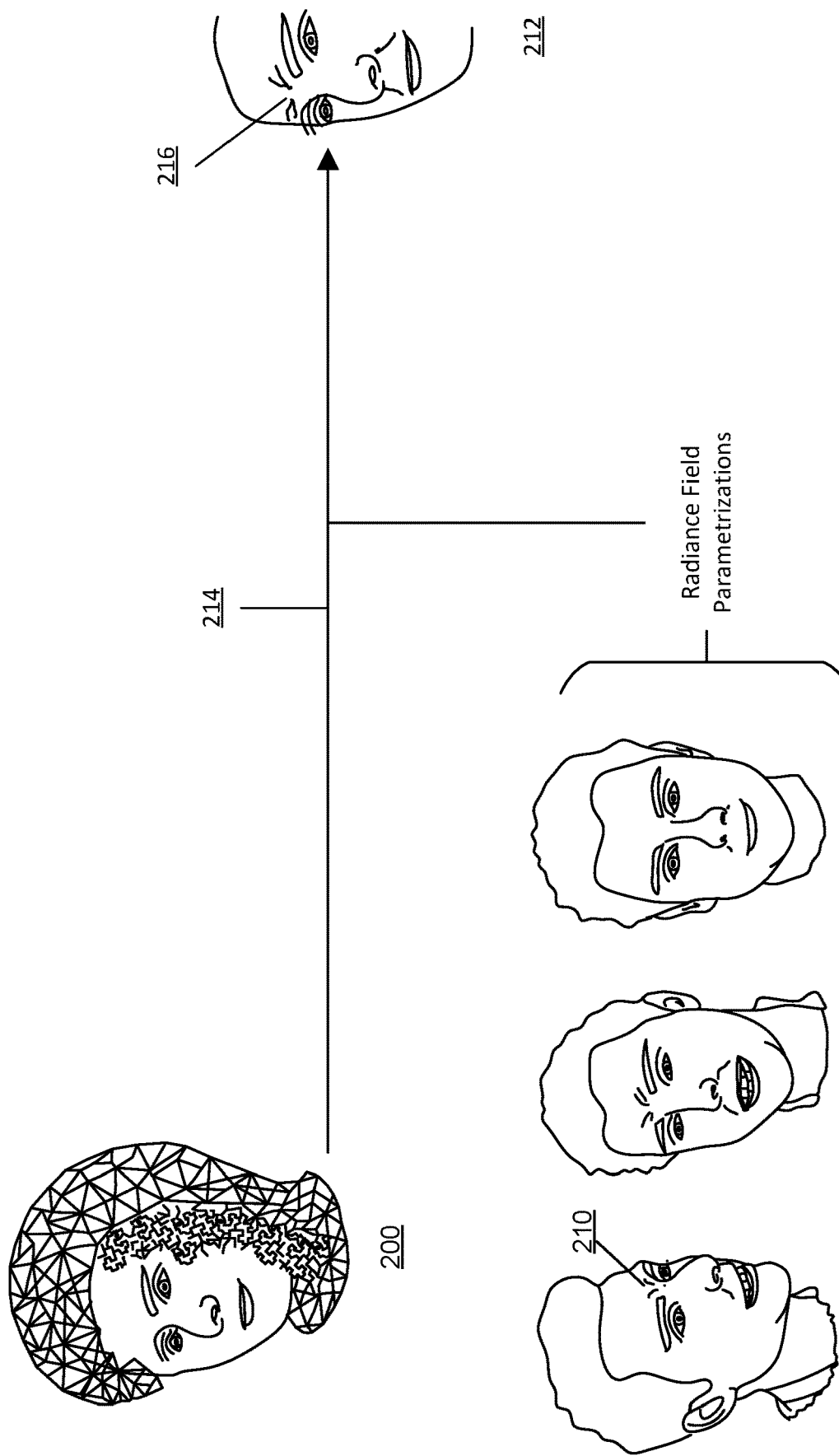
FIG. 2 shows a deformation description, three deformed states of a person's head used to train three radiance field parameterizations, and an image computed using the image animator of FIG. 1.

FIG. 2 shows a deformation description 200, an output image 212 computed using the image animator 100 of FIG. 1 and three states 204, 206, 208 of a person's head representing three different deformed states of the scene upon which radiance field parametrizations are learnt. The state of a person's head 204 shows a fine-grained feature 216, where the feature arises due to a local deformation of the face, such as movement of the eyebrows causing facial wrinkles. These wrinkles are an example of fine-grained features 216 that are not picked up by a coarse model, such as the model upon which the deformation description 200 is based. In various examples, the local deformation of fine-grained features 216 is a set of facial wrinkles. In various examples, local deformation refers to deformation within a threshold proximity. In various examples, the threshold proximity refers to primitive 3D shapes adjacent in the cage to a specific primitive 3D shape. In various examples, the threshold proximity refers to primitive 3D shapes within two, three, or more primitive 3D shapes of the specific primitive 3D shape. The deformation description 200 is a cage of primitive 3D elements which in the example of FIG. 2 are tetrahedra although other primitive 3D elements are used in some examples such as spheres or cuboids. In the example of FIG. 2 the cage of tetrahedra extends from a surface mesh of the person's head so as to include a volume around the head which is useful to represent hair of the person and any headgear worn by the person. In the case of generic objects such as chairs the volume around the object in the cage is useful because modelling the volume with volume rendering methods results in more photorealistic images and the cage only needs to approximate the mesh; this reduces the complexity of the cage for objects with many parts (the cage for a plant does not need to have a different part of each leave, it just needs to cover all foliage) and allows to use the same cage for objects of the same type that have a similar shape (in various examples, different chairs use the same cage). In various examples, the cage is intuitively deformed and controlled by users, physics-based simulation, or traditional automated animation techniques like blendshapes. Human faces are a particularly difficult case due to a non-trivial combination of rigid and (visco)elastic motion and yet the present technology performs well for human faces as described in more detail below. Once a radiance field is trained using the present technology, it is possible to generalize to any geometric deformation that can be expressed with the cage of 3D primitives constructed from its density.

This opens new possibilities to use volumetric models in games or augmented reality/virtual reality contexts where a user's manipulation of the environment is not known a priori.

The states of a person's head 204, 206 and 208, representing different deformed states of the scene, are used to train radiance field parametrizations, as described herein. The arrow 214 represents blocks of a method as described herein, such as in FIG. 4, and takes as input the radiance field parametrizations and the deformation description 200, and outputs image 212. The image 212 is an image depicting fine-grained detail that was not defined with the deformation description 200 alone. In various examples, the image 212 is of a face, and the fine-grained detail includes facial wrinkles. In various examples, the image 212 is of a cylinder of rubber material, and the fine-grained detail includes wrinkles in the rubber.

In this way, the method as described herein is able to infer fine-grained features that are not present in a coarse model, based on a plurality of learnt radiance field parameterizations that are blended i.e., used in a weighted combination, based on the local features of the deformation description. In this case, local features refer to the deformation of primitive 3D shapes in the deformation description 200 that are close to a subject primitive 3D shape. For example, the fine-grained features 216 corresponding to wrinkles around the eyes are blended based on a weighted combination of radiance field parameterizations trained on states 204-208, wherein the weights of the weighted combination are based on the deformation of the portion of the eyebrows close to the wrinkles. In various examples, the weights are based on the deformation of the entire eyebrows. In various examples, the weights are based on the deformation of other facial features.

In an example the deformation description 200 is referred to as a volumetric three dimensional morphable model (Vol3DMM) which is a parametric 3D face model which animates a surface mesh of a person's head and the volume around the mesh using a skeleton and blendshapes.

A user or an automated process is able to specify values of parameters of the Vol3DMM model which are used to animate the Vol3DMM model in order to create the images 204 to 208 as described in more detail below. Different values of the parameters of the Vol3DMM model are used to produce each of the three images 204 to 208. The Vol3DMM model together with parameter values is an example of a deformation description.

Vol3DMM animates a volumetric mesh with a sequence of volumetric blendshapes and a skeleton. It is a generalization of parametric three dimensional morphable models (3DMM) models, which animate a mesh with a skeleton and blendshapes, to a parametric model to animate a volume around a mesh.

Define the skeleton and blendshapes of Vol3DMM by extending the skeleton and blendshapes of a parametric 3DMM face model. The skeleton has four bones: a root bone controlling rotation, a neck bone, a left eye bone, and a right eye bone. To use this skeleton in Vol3DMM, extend linear blend skinning weights from the vertices of the 3DMM mesh to the vertices of tetrahedra by a nearest-vertex look up, that is, each tetrahedron vertex has the skinning weights of the closest vertex in the 3DMM mesh. The volumetric blendshapes are created by extending the 224 expression blendshapes and the 256 identity blendshapes of the 3DMM model to the volume surrounding its template mesh: the i-th volumetric blend-shape of Vol3DMM is created as a tetrahedral embedding of the mesh of the i-th 3DMM blend-shape. To create the tetrahedral embedding, create a single volumetric structure from a generic mesh and create an accurate embedding that accounts for face geometry and face deformations: it avoids tetrahedral inter-penetrations between upper and lower lips, it defines a volumetric support that covers hair, and has higher resolution in areas subject to more deformation. In an example, the exact number of bones or blendshapes is inherited from the specific instance of 3DMM model chosen, but in various examples, the technique is applied to different 3DMM models using blendshapes and/or skeletons to model faces, bodies, or other objects.

As a result of this construction, Vol3DMM is controlled and posed with the same identity, expression, and pose parameters $\alpha$, $\beta$, $\theta$ of a 3DMM face model. This means that it is possible to animate it with a face tracker built on the 3DMM face model by changing $\alpha$, $\beta$, $\theta$ and, more importantly, that it generalizes to any expression representable by the 3DMM face model as long as there is a good fit of the face model to the training frame. During training use the parameters $\alpha$, $\beta$, $\theta$ to pose the tetrahedral mesh of Vol3DMM to define the physical space, while a canonical space is defined for each subject by posing Vol3DMM with identity parameter a and setting R, 0 to zero for a neutral pose. In an example, the decomposition into identity, expression, and pose is inherited from the specific instance of 3DMM model chosen. However, the technology to train and/or animate adapts to different decompositions by constructing a corresponding Vol3DMM model for the specific 3DMM model chosen.

Figure 3A:
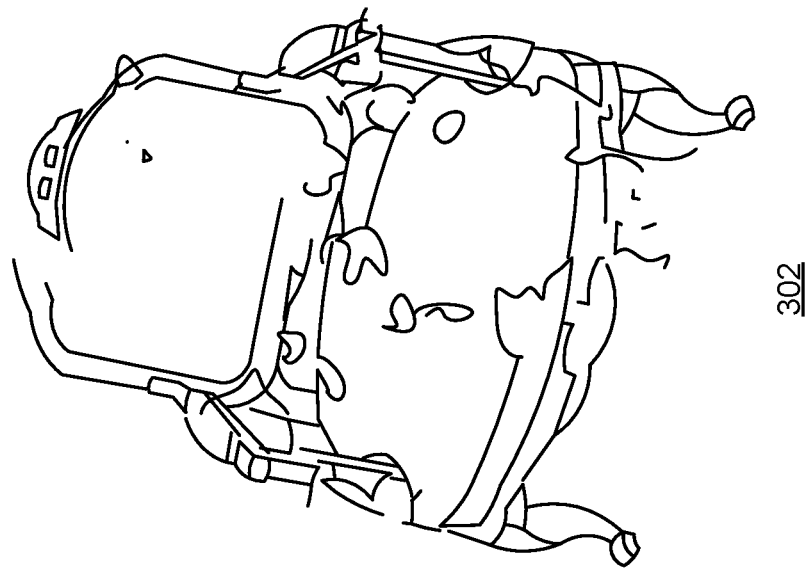
FIG. 3A shows a chair and an image of the chair shattering computed using the image animator of FIG. 1.
Figure 3A:
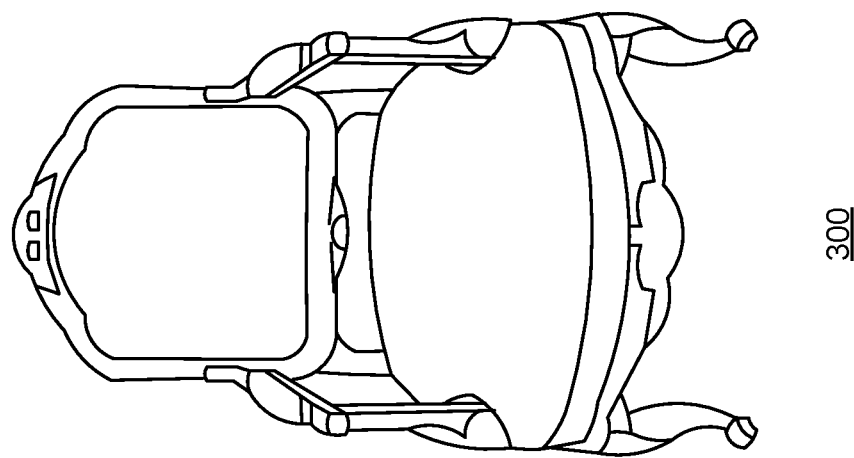

FIG. 3A shows a chair 300 and a synthetic image 302 of the chair shattering computed using the image animator of FIG. 1. In this case the deformation description comprises a cage around the chair 300 where the cage is formed of primitive 3D elements such as tetrahedra, spheres or cuboids. The deformation description also comprises information such as rules from a physics engine about how objects behave when they shatter.

Figure 3B:
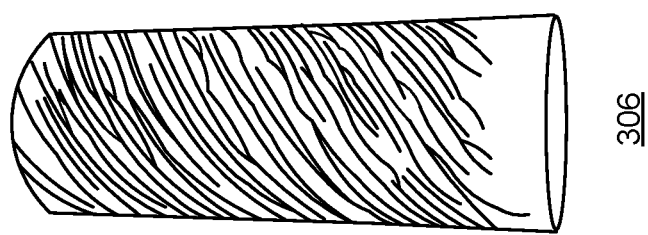
FIG. 3B shows a cylinder deformation computed using the image animator of FIG. 1.
Figure 3B:
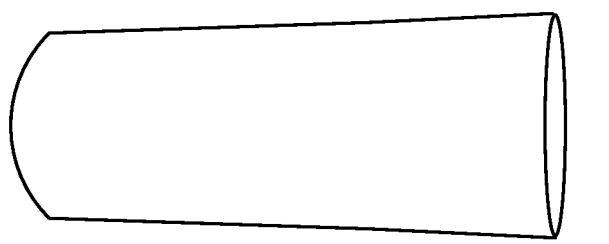

FIG. 3B shows a cylinder 304 and a deformed cylinder 306, where the deformed cylinder 306 is reproduced using the methods described herein. Actions that cause deformation are applied to cylinder 304, resulting in deformed cylinder 306 at a later time, which possesses fine-grained wrinkle features.

Figure 4:
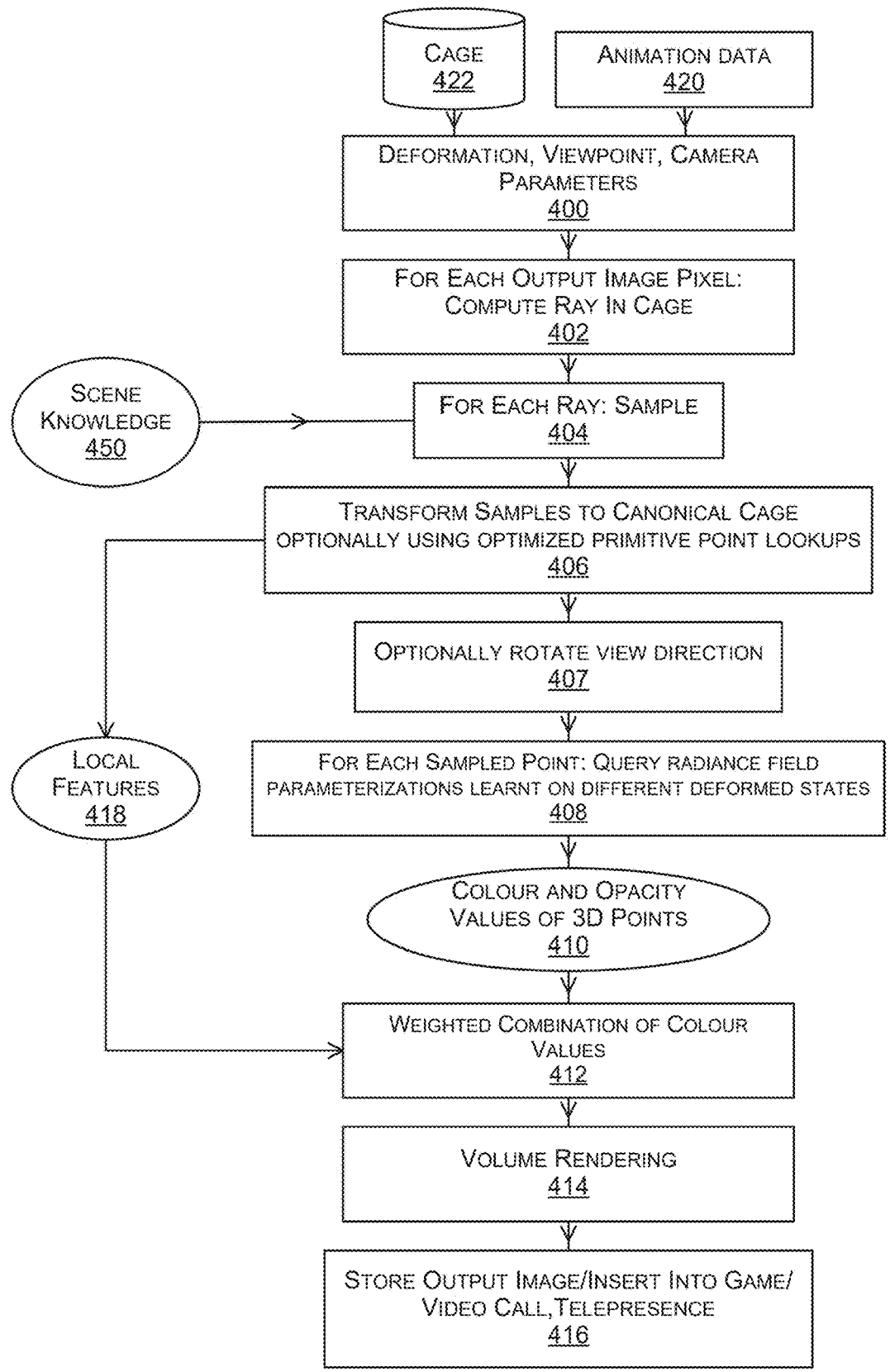
FIG. 4 is a flow diagram of an example method performed by the image animator of FIG. 1.

FIG. 4 is a flow diagram of an example method performed by the image animator of FIG. 1. Inputs 400 to the method comprise a deformation description, camera viewpoint and camera parameters. The camera viewpoint is a viewpoint of a virtual camera for which a synthetic image is to be generated. The camera parameters are lens and sensor parameters such as image resolution, field of view, focal length. The type and format of the deformation description depends on the type and format of the deformation description used in the training data when the radiance field parameterizations were trained. The training process is described later with respect to FIG. 7. FIG. 4 is concerned with test time operation after the radiance field parameterizations have been learnt. In various examples the deformation description is a vector of concatenated parameter values of a parameterized 3D model of an object in the dynamic scene such as a Vol3DMM model. In various examples the deformation description is one or more physics-based rules from a physics engine to be applied to a cage of primitive 3D elements encapsulating the 3D object to be depicted and extending into a volume around the 3D object.

In some examples the inputs 400 comprise default values for some or all of the deformation description, the viewpoint, the intrinsic camera parameters. In various examples the inputs 400 are from a user or from a game apparatus or other automated process. In an example, the inputs 400 are made according to game state from a computer game or according to state received from a mixed-reality computing device. In an example, animation data 420 provides values of the deformation description. In various examples, the animation data 420 is produced by a face or body tracker. The face or body tracker is a trained machine learning model which takes as input captured sensor data depicting at least part of a person's face or body and predicts values of parameters of a 3D face model or 3D body model of the person. The parameters are shape parameters, pose parameters or other parameters.

The deformation description comprises a cage 422 of primitive 3D elements. The cage of primitive 3D elements represents the 3D object to be depicted in the image and a volume extending from the 3D object. In various examples, such as where the 3D object is a person's head or body, the cage comprises a volumetric mesh with a plurality of volumetric blendshapes and a skeleton. In various examples where the 3D object is a chair, or other 3D object, the cage is computed from the learnt radiance field parameterization by computing a mesh from the density of the learnt radiance field volume using Marching Cubes and computing a tetrahedral embedding of the mesh. The cage 422 of primitive 3D elements is a deformed version of a canonical cage. That is, to produce a modified version of the scene the method begins by deforming a canonical cage to a desired shape which is the deformation description. The method is agnostic to the way in which the deformed cage is generated and what kind of an object is deformed.

The use of a cage to control and parametrize volume deformation enables deformation to be represented and applied to the scene in real-time; it is capable of representing both smooth and discontinuous function and allows for intuitive control by changing the geometry of the cage. This geometric control is compatible with machine learning models, physics engines, and artist generation software thereby allowing good extrapolation or generalization to configurations not observed in training.

In examples where the cage is formed from tetrahedra, using a collection of tetrahedra amounts to a piecewise-linear approximation of the motion field. Graphics processing unit (GPU)-accelerated raytracing allows the cage representation to be fast enough to query in milliseconds, even with highly complex geometry. The cage representation using tetrahedra is capable of reproducing hard object boundaries by construction and can be edited in off-the-shelf software due to being composed of only points and triangles.

At operation 402 the dynamic scene image generator computes a plurality of rays, each ray associated with a pixel of an output image 116 to be generated by the image animator. For a given pixel (x, y position in the output image) the image animator computes a ray that goes from the virtual camera through the pixel into the deformation description comprising the cage. To compute the ray the image animator uses geometry and the selected values of the intrinsic camera parameters as well as the camera viewpoint. The rays are computed in parallel where possible in order to give efficiencies since there is one ray to be computed per pixel.

At operation 404, for each ray, the image animator samples a plurality of points along the ray. Generally speaking, the more points sampled the better quality the output image. A ray is selected at random, and samples are drawn within specified bounds obtained from scene knowledge 450. In an example, the specified bounds are computed from training data which has been used to train the machine learning system. The bounds indicate a size of the dynamic scene so that the one or more samples are taken from regions of the rays which are in the dynamic scene. To compute the bounds from the training data standard image processing techniques are used to examine training images. It is also possible for the bounds of the dynamic scene to be manually specified by an operator or for the bounds to be measured automatically using a depth camera, global positioning system (GPS) sensor or other position sensor.

Each sample is assigned an index of a 3D primitive element of the deformed cage that the sample falls within.

At operation 406 the image animator transforms the samples from the deformation description cage to a canonical cage. A canonical cage is a version of the cage representing the 3D object in a rest state or other specified origin state, such as where the parameter values are zero. In an example where the 3D object is a head of a person the canonical cage represents the head of the person looking straight at the virtual camera, with eyes open and mouth shut and a neutral expression.

Where the primitive 3D elements are tetrahedra the transform of the samples to the canonical cage is computed using barycentric coordinates as described below. Using barycentric coordinates is a particularly efficient way of computing the transform.

In an example where the cage uses tetrahedra, a point p in deformed spaced is mapped to P in canonical space using barycentric coordinates defined for both the canonical tetrahedron $X=\{X_1,X_2,X_3,X_4\}$ as well as the deformed tetrahedron $$x = \{x_1, x_2, x_3, x_4\}.$$

A tetrahedron, one fundamental building block, is a four-sided pyramid. Define the undeformed 'rest' position of its four constituent points as:

$$X = \{X_1, X_2, X_3, X_4\} \qquad (1)$$

and use lower-case to denote the deformed state $x=\{x_1, x_2, x_3, x_4\}$. Because tetrahedra are simplices, it is possible to represent points that fall inside them using barycentric coordinates ($\lambda 1, \lambda 2, \lambda 3, \lambda 4$) in reference to the set X or x.

While an input point is recovered as $p=\Sigma_{i=1}^{4} \lambda_i * x_i$.

if p falls inside that tetrahedron, obtain its rest position P in the canonical space as:

$$P = \sum_{i=1}^{4} \lambda_i * X_i \qquad (2)$$

Eq. 2 states in words that the rest position of a point in the canonical space is equal to the sum over the four constituent points of a tetrahedra in which the point falls of the product of the barycentric coordinate of the point of the tetrahedra and the undeformed 'rest' position the point of the tetrahedra. Where the primitive 3D elements are spheres or cuboids the transform of the samples to the canonical cage is computed using affine transformations instead, which are expressive enough for large rigidly moving sections of the motion field.

From each camera, shoot rays into the physical space, detect the tetrahedra x0 incident to each sample p along the ray and compute its barycentric coordinates such that:

$$p = \sum_{i=1}^{4} \lambda_i^1 * x_i^0 \quad (3)$$

Eq. 3, in words, states that the sample point p in deformed space along the ray is equal to sum over the four constituent points of a tetrahedra incident to the sample point of the product of the barycentric coordinates of the point of the tetrahedra multiplied by the deformed state point of the tetrahedra incident to the sample point. In the case where the 3D elements are tetrahedra, an optimization is optionally used to compute the transform at operation 406 by optimizing primitive point lookups. The optimization comprises computing the transformation P of a sample by setting P equal to a normalized distance between a previous and a next intersection of a tetrahedron on a ray, times the sum, at the previous intersection, over four vertices of a tetrahedron of a barycentric coordinate of the vertex times a canonical coordinate of the vertex, plus one minus the normalized distance, times the sum, at the next intersection, over four vertices of the tetrahedron of the barycentric coordinate of a vertex time the canonical coordinate of the vertex. This optimization is found to give significant improvement in processing time such that real time operation of the process of FIG. 4 is possible at over 30 frames per second (i.e. to compute more than 30 images per second where the processor is a single RTX 3090 (trade mark) graphics processing unit).

The transformation from a non-canonical state to a canonical state of the scene of each sample 406 also outputs local features 418, which describe the volume change between canonical and non-canonical states of the cage, as will be elaborated on below. The local features 418 are input into the block 412 in which the weighted combination of color values is calculated. In various examples, a weighted combination of opacity values is additionally calculated. In various examples, local features refer to features within a threshold proximity. In various examples, the threshold proximity refers to primitive 3D shapes adjacent in the cage to a specific primitive 3D shape. In various examples, the threshold proximity refers to primitive 3D shapes within two, three, or more primitive 3D shapes of the specific primitive 3D shape.

Operation 407 is optional and comprises rotating a view direction of at least one of the rays. In this case, for one of the transformed samples, rotating a view direction of a ray of the sample is done prior to querying the learnt radiance fields. Computing a rotation R of the view direction for a small fraction of the primitive 3D elements and propagating the value of R to remaining tetrahedra via nearest neighbor interpolation is found to give good results in practice.

For each sampled point the dynamic scene image generator queries 408 the radiance field parametrizations 102. The radiance field parametrizations have already been trained to produce color and density values, given a point in the canonical 3D cage and an associated viewing direction, and each parameterization is learnt on a different deformed state of the scene. In response to each query each radiance field parameterization produces a pair of values comprising a color and an opacity at the sampled point in the canonical cage. The color values for each radiance field parameterization trained on different deformed states are output 410. As such, there are a plurality of color values for each sample.

Additionally, an opacity for each sample is output 410 by querying a radiance field parameterization of the 3D scene.

In various examples, outputting 410 an opacity for each sample by querying a radiance field parameterization of the 3D scene further comprises querying a plurality of radiance field parameterizations learnt on different deformed states of the scene. In various examples, the plurality of radiance field parameterizations queried to obtain opacity values are the same plurality of radiance field parameterizations queried to obtain color values. In various examples, querying the radiance field parameterizations 102 produces a plurality of opacity values and color values which are output 410.

In various examples, the parameterization queried to obtain an opacity value per-sample is one of the parameterizations used to obtain a color value. In various examples, the parametrization queried to obtain an opacity value per-sample is trained on a canonical state or rest state of the 3D scene. In this way the method computes a plurality of color and opacity values 410 of 3D points and view directions in the canonical cage with the deformation description applied.

In an example, the learnt radiance field parametrizations 102 are each a cache of associations between 3D points and view directions in the canonical version of the cage and color and opacity values, obtained by querying a machine learning model trained using training data comprising images of the dynamic scene from a plurality of viewpoints. By using a cache of values rather than querying a machine learning model directly, significant speed ups are achieved.

The radiance field is a function v which is queried to obtain the color c as well as density σ at that position in space. Commonly, the color of a pixel on the image plane, ĉ, is obtained via volume rendering using an emission-absorption form of the volume rendering equation:

$$\hat{c} = \sum_{i=1}^{N} w_i c_i, \quad (4)$$
$$w_i = T_i(1 - \exp(-\sigma_i \delta_i))$$

$\delta_i = (p_{i+1} - p_i)$ denotes the distance between samples (in total N) along straight rays, and the transmittance, $T_i$ is defined as $T_i = \exp(-\Sigma_{j=1}^{i-1} \sigma_j)$. Radiance field function v is usually modelled by a Multi-Layer Perceptron (MLP), an explicit voxel grid, or a combination of both. In addition to sample position p, V is also conditioned on the direction of the ray v, which allows it to model view-dependent effects such as specular reflections.

Eq. 4, in words, states that the color of a pixel on the image plane is equal to the sum over samples of a variable w of a sample multiplied by the color of the sample, wherein the variable w of a sample is equal to the transmittance of a sample multiplied by one minus the exponential of the negative density of the sample multiplied by the distance between samples along straight rays, In various examples, the radiance fields used are Neural Radiance Fields (NeRFs). NeRFs model a radiance volume with a coordinate based MLP learned from images that contain a pose. The MLP predicts color c(x, v) and density σ(x) for each point x in the volume and view direction v of a given camera. Each image pixel is associated with a ray r(t) cast from the camera center to the pixel. Samples along the ray are accumulated to determine the value of the image pixel C(r):

$$C(r) = \int_{t_n}^{t_f} T(t)\sigma(r(t)) c(r(t), v) dt \qquad (5)$$

where $t_n$ and $t_f$ are near and far planes and $T(t)$ is the transmittance function, which is given by:

$$T(t) = \exp\left(-\int_{t_n}^{t} \sigma(r(s)) ds\right) \qquad (6)$$

Eq. 5, in words, states that the value of the image pixel as a function of a ray is equal to the integral from near and far planes over planes of the transmittance function multiplied by the density as a function of the ray as a function of plane, multiplied by the color as a function of the ray as a function of plane and view direction.

Eq. 6, in words, states that the transmittance function as a function of plane is equal to the exponential of the negative integral between near and far planes over distance of the density as a function of ray as a function of distance.

The weights of the MLP are optimized to minimize the mean squared reconstruction error between the target pixel and the output pixel, as described in Eq. 10 and below.

The local features 418 and the color and opacity values of 3D points 410 are used to obtain the weighted combinations of color values 412. The opacity values obtained in 410 are combined with the weighted combinations of color values in the volume rendering 414. In various examples, obtaining the weighted combinations of color values 412 further comprises obtaining; weighted combinations of opacity values, wherein each opacity value of the opacity values is obtained, in 410, by querying a radiance field parameterization trained on a different deformed state of the scene to the other parametrizations used to obtain opacity values. The weights are related to the local features 418, as will be described below. Volumetric models that model novel expressions upon receiving an input expression are known. An expression is a description of the deformation of a scene. As mentioned herein, a new or novel expression is a deformed state of the scene that has not been seen by a model, and was not present in training data, and a neutral expression is a canonical state of the scene. An extreme expression is an expression that is used in training a model and has therefore been seen by the model.

An approach to fetching the density and radiance for a new expression employs a map T that outputs the density and radiance for a new expression e based upon a neutral expression $\bar{e}$ in the canonical frame:

$$c(x; e) = \bar{c}(\bar{x}), \bar{x} = T(x; e \to \bar{e}) \qquad (7)$$

$$\sigma(x; e) = \bar{\sigma}(\bar{x}), \bar{x} = T(x; e \to \bar{e}) \qquad (8)$$

$$\mathcal{L}_{rgb} = \mathbb{E}_{C \sim \{C_c\}} \mathbb{E}_{r \sim C} \mathcal{L}_{rgb}^r \qquad (9)$$

$$\mathcal{L}_{rgb}^r = \|C(r; e) - C(r)\|_2^2 \qquad (10)$$

Eq. 7, in words, states that the color as a function of sample and expression is equal to the color in the canonical state of the sample in the canonical state, wherein the sample in the canonical state is equal to a mapping as a function of sample and expression change from non-canonical to canonical states. The mapping T is computed to render novel expressions e from smooth deformations of a tetrahedral mesh.

Eq. 8, in words, states that the density as a function of sample and expression is equal to the density in the canonical state of the sample in the canonical state, wherein the sample in the canonical state is equal to a mapping as a function of sample and expression change from non-canonical to canonical states.

Eq. 9, in words, states that the rgb-loss is equal to the pixel-rgb loss average over all of the pixels in all of the images belonging to a collection of posed images, wherein Eq. 10, in words, states that the pixel rgb-loss is equal to the squared two-norm of the pixel color produced by the model minus the ground truth pixel color.

In this approach, the inventors notice that changes in appearance do not include changes caused by shadowing caused by deformations by T, because neither density nor radiance vary with the novel expression e.

The model implementing a method described herein is designed to allow the radiance to vary with the novel expression e. The inventors notice that by allowing radiance to be defined as the sum of K residual radiances, beneficial effects can be derived. By allowing the radiance to behave in the described way, a weighted combination of the color values 412 is calculated:

$$c(x; e) = \sum_{k=k}^{K} \alpha_k(x; e) \cdot \bar{c}_k(x) \qquad (11)$$

Eq. 11, in words, states that the color as a function of sample and expression is equal to the sum over radiances of a weighting as a function of sample and expression multiplied by the color of the radiance as a function of sample. The model is trained by assuming that a small set of K images is accessible, each corresponding to an extreme expression, and then the rgb-loss is minimized:

$$\mathcal{L}_{rgb} = \mathbb{E}_k \mathbb{E}_r \|C_K(r; e_k) - C_k(r)\|_2^2 \qquad (12)$$

Eq. 12, in words, states that the rgb-loss is the same as in Eq. 10, but wherein instead of using Eq. 7 for rendering as in the approach described above, the inventors have noticed that using Eq. 11 is beneficial, wherein $\alpha_k$ in Eq. 11 is the indicator vector which has a value of one at the k-th position and zero elsewhere. Eq. 12 comprises the squared two-norm of the integrated radiances along a ray as a function of pixel and extreme expression in an image of the K images minus the image as a function of pixel.

It should be noted that $\forall x, \alpha(x) = \mathbb{1}_k$, noting that $\mathbb{1}_k$ is the indicator vector, which has a value of one at the k-th position and zeroes elsewhere, and $C_K$ represents the output of integrating the radiances along a ray.

To control the model, given a novel expression e, the input expression code needs to be mapped to the corresponding blend field $\alpha(x)$. The blend field is parametrized as a vector field discretized on the vertices V(e) of the tetrahedral mesh. The vertices have the ability to deform depending on the given expression.

For a description of local geometry, consider a tetrahedron as a matrix formed by its vertices $T = \{v_i\} \in \mathbb{R}^{3 \times 4}$ and its edge matrix as $D = [v_3 - v_0, v_2 - v_0, v_1 - v_0]$. Define the edge matrix in rest pose as $\bar{D}$ and the deformed tetrahedra, deformed due to expression, as D. The change in volume can then be computed from the determinant of its deformation gradient:

$$\Delta V(T) = \det(D \cdot \bar{D}^{-1}) \qquad (13)$$

Eq. 13, in words, states that the change in volume as a function of vertices of a tetrahedron is equal to the determinant of the edge matrix of the tetrahedron multiplied by the inverse of the edge matrix of the tetrahedron in rest pose. In various examples, 3D primitive shapes other than tetrahedra, such as triangles or other shapes, are used. Then, a local volumetric description is built for a specific deformed vertex v(e) by concatenating the changes in volume of neighboring deformed tetrahedra:

$$\mathcal{G}(v(e)) = \bigoplus_{T \in \mathcal{N}(v)} \Delta V(T(e)) \qquad (14)$$

where $\mathcal{N}(v)$ is the topological neighborhood of a vertex v and $\oplus$ denotes concatenation.

Eq. 14, in words, states that the local volumetric description as a function of deformed vertices is the concatenation for vertices of a tetrahedron belonging to the topological neighborhood of a vertex of the change in volume as a function of vertices of a tetrahedron as a function of expression. In various examples, the topological neighborhood of a vertex is the closest vertices, up to the second closest vertices, up to the third closest vertices, or any sensible choice of neighborhood.

When the local geometry of the mesh matches the local geometry in one of the input expressions, the corresponding expression blend weight is locally activated. Let v ∈ V be a vertex in the tetrahedra and $\mathcal{G}(v)$ be a local measure of volume on the vertex described previously. Then, $$\mathcal{G}(v(e)) \approx \mathcal{G}(v(e_k)) \Longrightarrow \alpha(v(e)) \approx \mathbb{1}_k \qquad (15)$$

Eq. 15, in words, states that when the local measure of volume as a function of vertex in a tetrahedra as a function of an expression e is approximately equal to the local measure of volume as a function of vertex in the tetrahedra of the expression of the k-th radiance, the blendfield or 'weighting' as a function of vertex as a function of expression should be approximately equal to one for the k-th radiance. As such, a local similarity measure is defined as:

$$[\Delta \mathcal{G}_k(v(e))] = \left[ \| \mathcal{G}(v(e)) - \mathcal{G}(v(e_k)) \|_2^2 \right] \in \mathbb{R}^K \qquad (16)$$

Eq. 16 states that the local similarity measure as a function of vertex as a function of expression is equal to the squared two-norm of the local measure of volume as a function of vertex in a tetrahedra as a function of expression minus the local measure of volume as a function of vertex as a function of the expression of the k-th radiance. This is then gated with a softmax function to obtain the vertex blend weights:

$$\alpha(v(e)) = \operatorname{softmax}_\tau \{\Delta \mathcal{G}_k(v(e))\} \in [0, 1]^K \qquad (17)$$

Eq. 17, in words, states that the blendfield or 'weights' as a function of vertex as a function of expression is equal to the softmax which is a function of temperature of the local similarity measure as a function of vertex as a function of expression. In various examples, a temperature of $\tau=10^6$ is used. The softmax gated formula realizes Eq. 15 and preserves the desirable characteristics of blend weights, which are partition of unity and activations sparsity. The former ensures the result is a convex combination of input data and the latter prevents destructive interference.

As such, the weights of the weighted combination of color values are related to the local features 418 obtained during the transformation of samples to a canonical cage 406. In various examples, a weighted combination of opacity values is calculated, wherein the opacity values of the weighted combination are obtained in the same way as the color values i.e. by querying radiance field parameterizations learnt on different deformed states of the scene. In various examples, the weights of the weighted combination of opacity values are also related to the local features 418 obtained during the transformation of samples to a canonical cage 406.

For each ray, a volume rendering 414 method is applied to the weighted combinations of the color values and the opacity values computed along that ray, to produce a pixel value of the output image. Any well-known computer graphics method for volume ray tracing is used. Where real time operation is desired hardware-accelerated volume rendering is used.

The output image is stored 416 or inserted into a virtual webcam stream or used for telepresence, a game or other applications.

Figure 5:
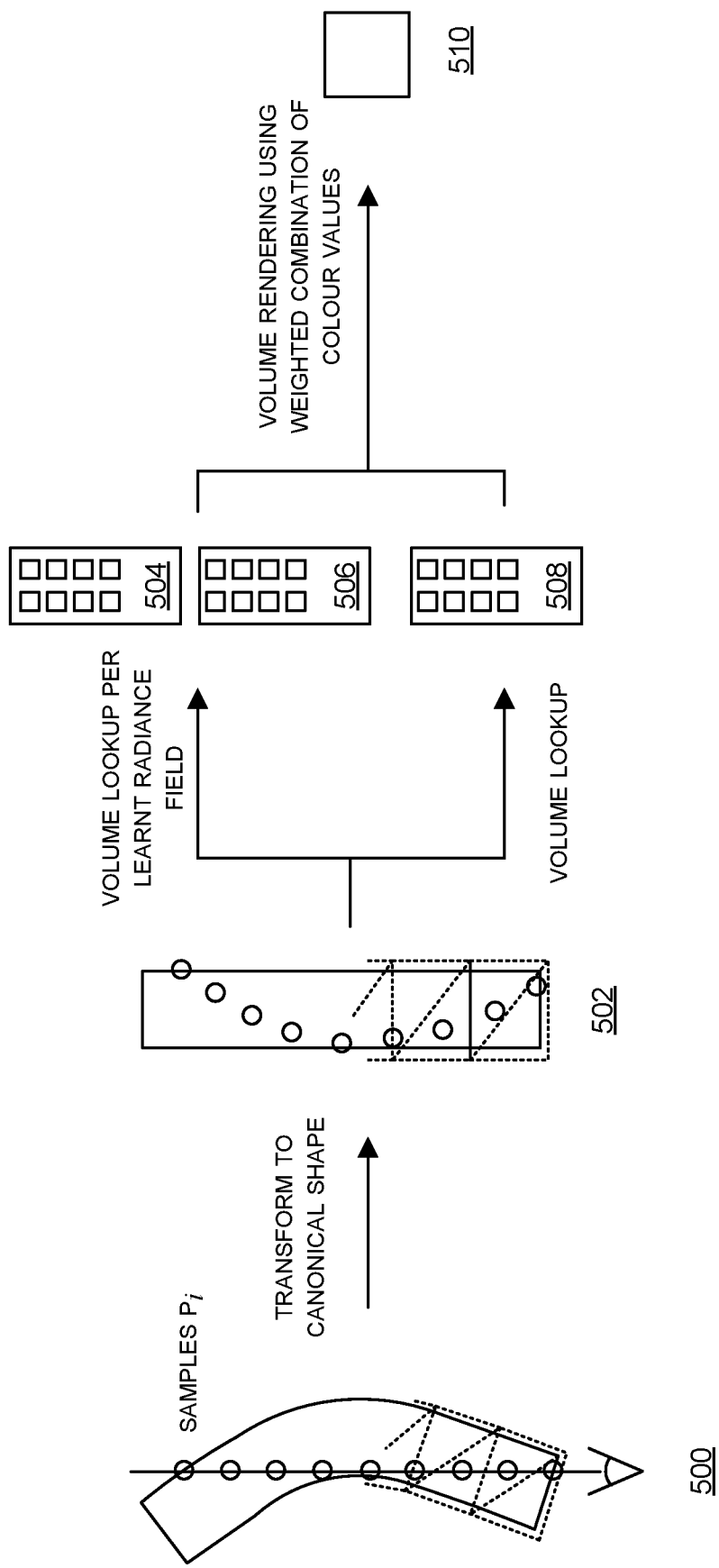
FIG. 5 is a schematic diagram of a ray in a deformed cage, the ray transformed to a canonical cage, a plurality of volume lookups and volume rendering.

FIG. 5 is a schematic diagram of a ray in a deformed cage 500, the ray transformed to a canonical cage 502, volume lookups 504 and 506 for different deformed states of a scene, a volume lookup 508, and volume rendering 510. To render a single pixel a ray is cast from the camera center, through the pixel into the scene in its deformed state. A number of samples are generated along the ray and then each sample is mapped to the canonical space using the deformation $M_j$ of the corresponding tetrahedron j. In various examples, a primitive 3D shape other than a tetrahedron is used. A plurality of volumetric representations of different deformed states of the scene are then queried with the transformed sample position $p_j'$ and the direction of the ray rotated based on the rotation of the j-th tetrahedron. The resulting per-sample color values are then weighted to compute a weighted combination of color values across the volumetric representations of the scene, wherein the weights of the weighted combination are related to the local features. In various examples, the weights of the weighted combinations are related to the local features via a softmax-gated local similarity measure that is equivalent to a vector field of the weights discretized on vertices of the cage, wherein the local similarity measure defines the difference between a local measure of volume between canonical and non-canonical states of the cage, as described above.

A single volumetric representation of the scene is also queried with the transformed sample position $p'_j$ and the direction of the ray rotated based on the rotation of the j-th tetrahedron, as above. The resulting per-sample opacity value is integrated with the weighted combination of color values using volume rendering as in Eq. 4.

In various examples, the single volumetric representation of the scene queried to obtain an opacity is one of the plurality of volumetric representations of the different deformed states of the scene queried to obtain the color values. In various examples, the single volumetric representation is not one of the plurality of volumetric representations.

The density and color at each point in the scene is a function of both sample position and view direction. If sample positions are moved, but view directions stay unchanged, the light reflected off the elements of the scene will appear the same for every deformation. To alleviate this problem, the view direction of each sample is rotated with a rotation between the canonical tetrahedron and its deformed equivalent:

$$v' = Rv \quad (18)$$

$$U, E, V = SVD\left((X - cX)^T(X' - c'X)\right) \quad (19)$$

$$R = UV^T \quad (20)$$

Here, cX, c'X are the centroids of the canonical and deformed states of the tetrahedron that a given sample falls into. With this approach, the direction from which the light is reflected at each point of the scene will match the deformation induced by the tetrahedral mesh. Note however, that the reflected light will represent the scene in its canonical pose. Eqs. 18, 19 and 20 above, in words, state that a transformed view direction is equal to a rotation matrix multiplied by an original view direction, wherein the rotation matrix is defined as matrix U multiplied by the transpose of matrix V, and wherein the matrices U and V are defined as part of the singular value decomposition of the transpose of the canonical state minus the centroid of the canonical state multiplied by the deformed state minus the centroid of the deformed state of the tetrahedron that a given sample falls into, which is equivalent to the three matrix components U, E and V.

In practice, computing R for each sample or even each tetrahedron in the scene is inefficient as it requires computing Singular Value Decomposition (SVD). Instead, a stochastic approach is taken wherein R is computed for a small fraction ρ of tetrahedra and R is propagated to the remaining tetrahedra via nearest neighbour interpolation. In the experiments described herein ρ=0.05.

More detail about an example of the primitive point lookups is now given.

With complex meshes, checking each tetrahedron for association with each input point is difficult given the complexity of point-in-tetrahedron tests. For non self-intersecting tetrahedral meshes the notions of a point being 'in front' or 'behind' a certain triangle are uniquely determined by the triangle vertices' winding order. Determining which tetrahedron a point belongs to amounts to shooting a ray in a random direction from the point, evaluating the triangle at first intersection and checking which side of the triangle the sample is on. This identifies the tetrahedron uniquely as each triangle can belong to at most two tetrahedra. Especially when hardware acceleration is available, these queries are highly efficient in terms of memory and compute.

In an example, apply the same acceleration to arbitrarily triangulated shapes to combine tetrahedra with triangulated rigidly moving shapes that do not need to be filled with tetrahedra but can be treated as a unit in terms of deformation. Second, reduce the number of point-in-tetrahedron tests by noting that many samples along a single ray can fall into the same element. Knowing the previous and next intersection, a simple depth-test determines which tetrahedron samples fall into. Barycentric coordinates are linear, and so obtain a barycentrically interpolated value by interpolating values at the previous and next intersection within each element. To do this, rewrite Equation (3) as:

$$p = a * \sum_{i=1}^{4} \lambda_i^1 * \chi_i^1 + (1.0 - a) * \sum_{i=1}^{4} \lambda_i^2 * \chi_i^2 \quad (21)$$

Here, the superscripts 1 and 2 refer to the previous and next intersection, and a is the normalized distance between the two intersections which defines the point the method is interpolating for. Eq. 21, in words, states that the transformation p of a sample is equal to a normalized distance between a previous and a next intersection of a tetrahedron on a ray, times the sum, at the previous intersection, over four vertices of a tetrahedron of a barycentric coordinate of a vertex times a canonical coordinate of the vertex, plus one minus the normalized distance, times the sum, at the next intersection, over four vertices of the tetrahedron of the barycentric coordinate of a vertex times the canonical coordinate of the vertex.

Thanks to this modification, per point values remain stable even if the 'wrong' side of a triangle (or incorrect triangle all together) is queried due to a lack of numerical precision. One side effect of this per-ray as opposed to per-point formulation of tetrahedral index lookups is that it naturally integrates with ray marching approaches to rendering. In the latter, rays are terminated based on transmittance, which the reformulated tetrahedral lookup formula naturally allows.

Figure 6:
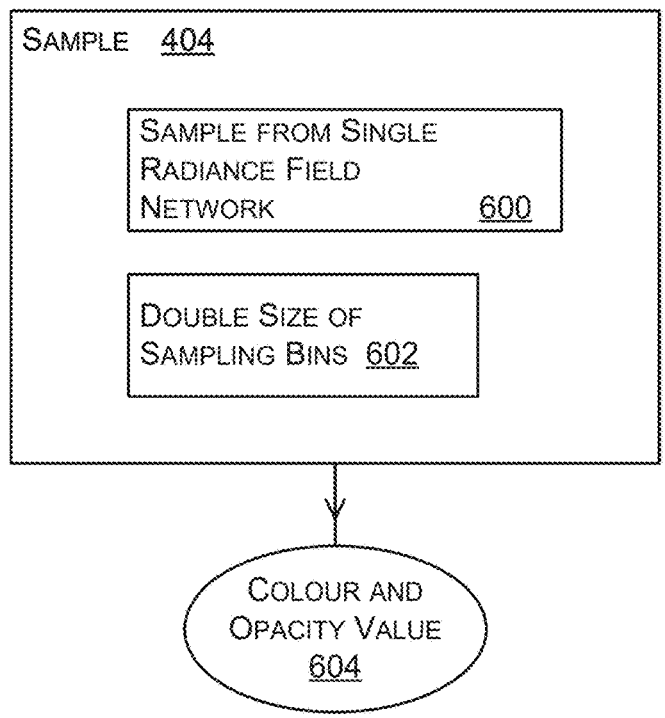
FIG. 6 is a flow diagram of a method of sampling.
Figure 6:
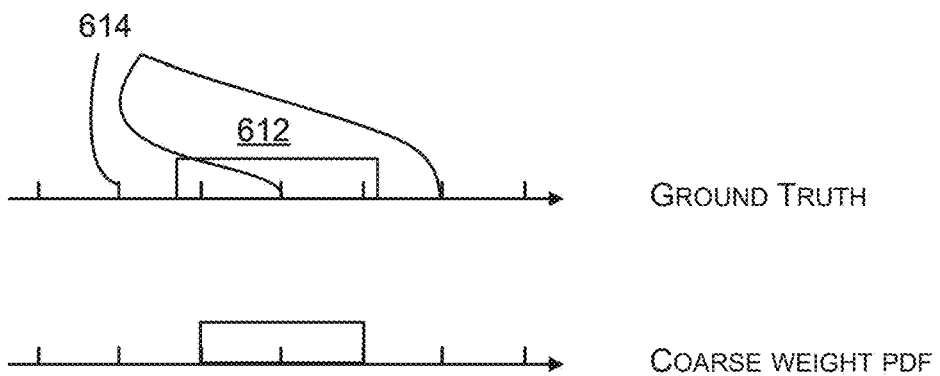
Figure 6:
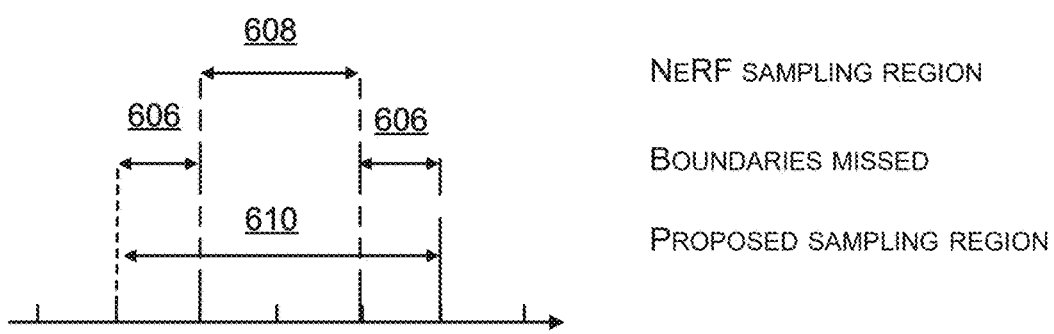

FIG. 6 is a flow diagram of a method of the sampling referenced in operation 404 as described previously with reference to FIG. 4. The method comprises querying the learnt radiance field of the 3D scene to obtain a color value and an opacity value 604, using only one radiance field network 600 and increasing (e.g., "doubling") a size 602 of sampling bins. In various examples, a plurality of radiance fields of the 3D scene are learnt, each on different deformed states of the scene, and each radiance field is queried to obtain a color value. In various examples, additionally, a radiance field of the 3D scene learnt on the input scene is queried to obtain an opacity value. In various examples, a plurality of radiance fields of the 3D scene are each queried to obtain an opacity value.

Volumetric rendering typically involves sampling the depth along each ray. In examples there is a sampling strategy which enables capturing thin structures and fine details as well as improving sampling bounds. The method gives improved quality at a fixed sampled count.

Some approaches represent the scene with two Multi-Layer Perceptrons (MLPs): a 'coarse' and a 'fine' one. First, Nc samples are evaluated by the coarse network to obtain a coarse estimate of the opacities along the ray. These estimate then guides a second round of Nf samples, placed around the locations where opacity values are the largest. The fine network is then queried at both coarse and fine sample locations, leading to Nc evaluations in the coarse network and Nc+Nf evaluations in the fine network. During training, both MLPs are optimized independently, but only the samples from the fine one contribute to the final pixel color. The inventors have recognized that the first Nc samples evaluated in the coarse MLP are not used in rendering the output image, therefore being effectively wasted.

To improve efficiency, avoid querying the fine network at the locations of coarse samples and instead reusing the output from the first round of coarse samples with a single MLP network.

The simple change of using one network instead of two results in artefacts appearing, where areas around segments of a ray that have been assigned high weights can be clipped as illustrated in FIG. 6, 606, 608. Clipping can occur because the bin placement for drawing the fine samples treats density like a step function at the sample location instead of a point estimate of a smooth function. Therefore the size of each importance sampling bin 610 is doubled, allowing importance samples to cover the whole range between the coarse samples as illustrated in FIG. 6, 612, 614.

Figure 7:
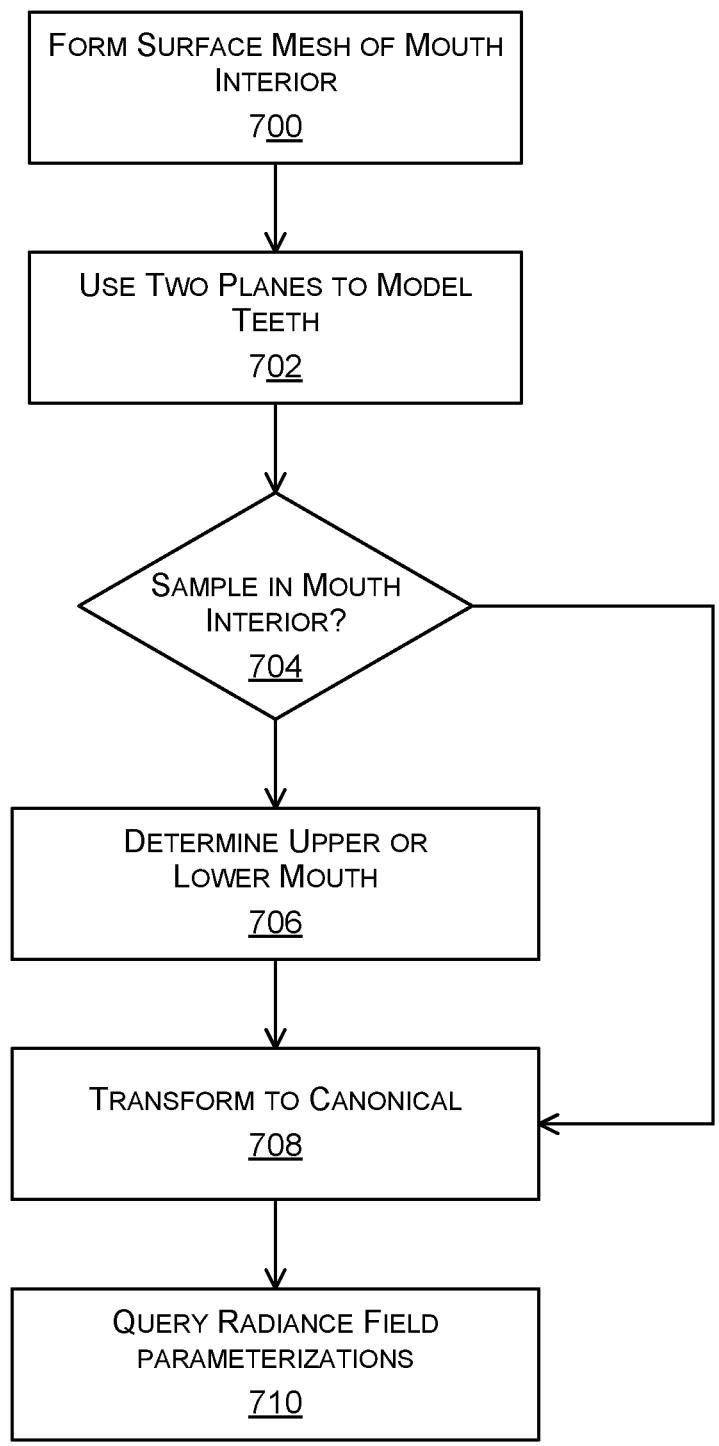
FIG. 7 is a flow diagram of a method of computing an image of a person depicting their mouth open.

FIG. 7 is a flow diagram of a method of computing an image of a person depicting their mouth open. The method of FIG. 7 is optionally used where only one or two time instances are used in the training images. If many time instances are available in the training images the process of FIG. 7 is not needed. In the method the cage represents a person's face and comprises a mesh of a mouth interior 700, a first plane to represent an upper set of teeth of the person and a second plane 702 to represent a lower set of teeth of the person. The method comprises checking 704 whether one of the samples falls in an interior of the mouth, if so, determining 706 upper or lower mouth, and computing the transform 708 of the sample using information about the first and second planes. The transformed sample is used to query 710 the radiance field and the method proceeds as in FIG. 4.

In an example, a separate deformation model is defined for the mouth interior, bounded by closed triangular primitives, and animated by two rigidly moving planes, one for each set of teeth.

The example operates in a minimal-data training regime and uses a single frame to train the models. Animation is then driven by an 'a priori' known animation model, Vol3DMM in the case of animating faces. Therefore, the cage geometry model is such that the primitives are non-self-intersecting (to allow for real time rendering) and are driven with Vol3DMM. In the case of a mouth interior, a cavity fully filled with tetrahedra is not an appropriate choice, because the rendered teeth would deform as the mouth opens. This would result in unrealistic appearance and motion. An alternative of placing rigidly deforming tetrahedra around the teeth would require a very high precision of geometry estimation.

Instead, a different primitive for the mouth interior is selected. First, the mouth interior is filled with tetrahedra as if it was treated identically to the rest of the head and second, recording the indices of the outer triangles of the tetrahedra corresponding to the mouth interior, effectively forming a surface mesh for the mouth interior. This surface mesh moves together with the rest of the head and is used to determine which samples fall inside the mouth interior, but is not used to deform them back to the canonical space. A GPU-accelerated raytracing supports both tetrahedra and triangle-bounded primitives, allowing the changing of the primitive that is driving the animation.

To model deformations, two planes are used, one placed just below the top teeth and one just above the bottom teeth. Both of these planes move rigidly (i.e., they both remain planar), together with an underlying Volumetric 3D Morphable Model of the face. It is assumed that the teeth move rigidly with these planes and decide not to support the tongue, therefore assume that the space between the planes is empty.

With the surface mesh bounding the entirety of the mouth cavity and these two planes, the mouth interior is animated with the following steps.

(1) Detect the primitive in which each sample falls and check if it is the mouth interior primitive.

(2) For each sample within the mouth interior primitive determine if it is the upper or lower mouth it falls in, using the signed distance to the upper and lower planes.

(3) Deform back to canonical by 1) computing the coordinates of the samples relative to the relevant plane, 2) finding the location of the plane in the canonical space and 3) assuming the relative coordinates of the sample to the relevant plane remain unchanged, computing the coordinates of the samples in the canonical space.

In an example a canonical pose is one with the mouth closed, i.e., with the teeth overlapping (top of bottom teeth is above the bottom of upper teeth). In various examples, a canonical pose is one wherein the face has a neutral expression including a closed mouth. As a result, upper and lower mouth regions partially overlap in canonical space. Thus, the color and density learnt in the canonical space have to be the average of the corresponding regions in the upper and lower mouth. To overcome this obstacle, the canonical regions for the upper and lower mouth interior are placed outside of the tetrahedral cage, to the left and to the right of it. This placement, alongside with the assumption of empty space between the two planes, results in a bijective mapping of samples from the mouth interior in the deformed space to the canonical space, allowing for correct learning of a Radiance Field for that region.

Figure 8:
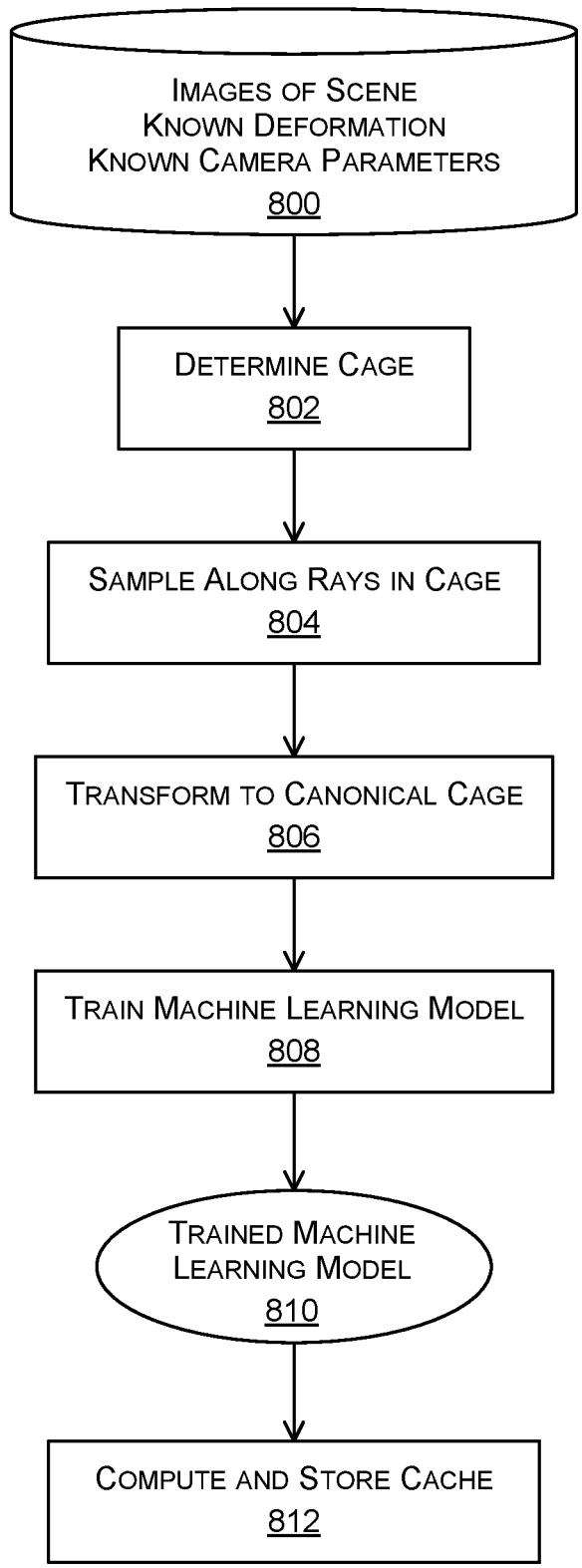
FIG. 8 is a flow diagram of a method of training a machine learning model and computing a cache.

FIG. 8 is a flow diagram of a method of training a machine learning model and computing a cache for use in an image animator 100. Training data 800 is accessed comprising images of a scene (either static or dynamic) taken from many viewpoints. Training is possible using sets of images of a static scene as training data. It is also possible using sequences where each image represents the scene in a different state.

FIG. 8 is first described for the case where the images are of the scene from a plurality of different viewpoints obtained at the same time instance or two time instants so that the amount of training data needed for enrollment is relatively low. By using a single time instant or two time instants accuracy is improved where a face tracker is used to compute the ground truth parameter values of the deformation description. This is because the face tracker introduces error and if it is used for frames at many time instances there is more error.

The training data images are real images such as photographs or video frames. It is also possible for the training data images to be synthetic images. From the training data images, tuples of values are extracted where each tuple is a deformation description, a camera viewpoint, camera intrinsic parameters and a color of a given pixel.

In the example of the chair from FIG. 3A, the training data comprises images of the chair taken from many different known viewpoints at the same time instant. The images are synthetic images generated using computer graphics technology. From each training image a tuple of values is extracted where each tuple is a deformation description, a camera viewpoint, camera intrinsic parameters and a color of a given pixel. The deformation description is a cage which is determined 802 by using known image processing techniques to place a cage of primitive 3D elements around and extending from the chair. A user or an automated process such as a computer game, triggers a physics engine to deform the cage using physics rules, such as to shatter the chair when it falls under gravity, or to crush the chair when it experiences pressure from another object. In the example of the cylinder from FIG. 3B, the training data comprises images of the cylinder taken from many different known viewpoints at the same time instant. A user or an automated process such as a computer game, triggers a deformation of the cylinder which causes it to wrinkle.

To form the training data, samples are taken along rays in the cage 804 by shooting rays from a viewpoint of a camera which captured the training image, into the cage. Samples are taken along the rays as described with reference to FIG. 4. Each sample is assigned an index of one of the 3D primitive elements of the cage according to the element the sample falls within. The samples are then transformed 806 to a canonical cage, which is a version of the cage in a rest position. The transformed samples are used to compute an output pixel color by using volume rendering. The output pixel color is compared with the ground truth output pixel color of the training image and the difference or error is assessed using a loss function. The loss function output is used to carry out backpropagation so as to train 808 the machine learning model and output a trained machine learning model 810. The training process is repeated for many samples until convergence is reached.

The resulting trained machine learning model 810 is used to compute and store a cache 812 of associations between 3D positions and view directions in the canonical cage and color and opacity values. This is done by querying the trained machine learning model 810 for ranges of 3D positions and storing the results in a cache.

A plurality of trained machine learning models are trained in this way, each on different deformed states of the scene, and are queried to obtain per-sample color values for each machine learning model. Additionally, a machine learning model is queried to obtain a per sample opacity value. In various examples, this machine learning model is trained on the canonical version of the scene. In various examples, a per-sample density value is instead obtained, wherein density is the logarithm of opacity. In various examples, querying the machine learning model to obtain a per-sample opacity value further comprises querying the plurality of trained machine learning models to obtain per-sample opacity values for each machine learning model.

In the example of the faces from FIG. 2, the training data for each deformed state of the scene comprises images of the person's face taken from many different known viewpoints at the same time. Associated with each training data image are values of parameters of a Vol3DMM model of the person's face and head. The parameters include pose (position and orientation) of the eyes, and bones of the neck and jaw, as well as blendshape parameters which specify characteristics of human facial expressions such as eyes shut/open, mouth shut/open, smile/no smile and others. The images are real images of a person captured using one or more cameras with known viewpoints. A 3D model is fitted to each image using any well-known model fitting process whereby values of parameters of the 3DMM model used to generate Vol3DMM are searched to find a set of values which enable the 3D model to describe the observed real image. The values of the parameters which are found are then used to label the real image and are a value the deformation description. Each real image is also labelled with a known camera viewpoint of a camera used to capture the image.

The process of FIG. 8 operations 802 to 812 is then carried out.

The machine learning model is trained 808 with a training objective that seeks to minimize the difference between color produced by the machine learning model and color given in the ground truth training data.

In some examples involving face animation a sparsity loss is optionally applied in the volume surrounding the head and in the mouth interior.

Sparsity losses allow to deal with incorrect background reconstruction, as well as to mitigate issues arising from disocclusions in the mouth interior region. In an example, use a Cauchy loss:

$$\mathcal{L}_s = \frac{\lambda_s}{N} \sum_{i,k} \log\left(1 + 2\sigma(ri(tk))^2\right) \quad (22)$$

Wherein i indexes rays ri shot from training cameras and k indexes samples tk along each of the rays. N is the number of samples to which the loss is applied, $\lambda_s$ is a scalar loss weighting hyperparameter, and a is the opacity returned by the radiance field parameterization. In words, Eq. 22 states that the Cauchy loss $\mathcal{L}_s$ is equal to a scalar loss weighting hyperparameter divided by the number of samples to which the loss is applied, multiplied by the sum over all rays shot from training cameras and samples along each of the rays, of the logarithm of one plus two multiplied by the opacity returned by the radiance field parameterization multiplied by the squared ray shot from the training camera as a function of the sample along the ray. To ensure the space is evenly covered by the sparsity loss, the Cauchy loss is applied to the 'coarse' samples. Other sparsity-inducing losses like 11 or weighted least-squares also work. The sparsity loss is applied in two regions: in the volume surrounding the head and in the mouth interior. Applied to the volume surrounding the head, the sparsity loss prevents opaque regions appearing in areas where there is not enough multi-view information to disentangle foreground from background in 3D. To detect these regions, the loss is applied to (1) samples which fall in the tetrahedral primitives as this is the region rendered at test-time, and (2) samples which belong to rays which fall in the background in the training images as detected by 2D face segmentation network of the training images. Also, the sparsity loss is applied to the coarse samples that fall inside the mouth interior volume. This prevents the creation of opaque regions inside the mouth cavity in areas that are not seen at training, and therefore have no supervision, but become disoccluded at test time.

The sparsity loss inside the mouth interior ensures there is no unnecessary density inside the mouth interior. However, the color behind the regions which were occluded at training frame remains undefined, resulting in displeasing artefacts when these regions are disoccluded at test-time. A solution here is to override the color and density of the last sample along each ray that falls in the mouth interior, which allows to set the color of disoccluded regions at test-time to match the color of the learnt color in the visible region between the teeth at training time.

The present technology has been tested empirically on both real and synthetic data.

The method described herein was tested using a volumetric 3DMM face model, wherein a face model was created by extending the blendshapes of the parametric 3DMM face model to a tetrahedral cage that defines the support in a neural radiance field. A single neural network was used to predict color and density values for each radiance field parameterization for both coarse and fine samples, with the size of sampling bins increased to avoid aliasing effects.

During training of each radiance field, rays were sampled from a single frame, with each batch containing 1024 rays. 128 points along a single ray were sampled for coarse sampling and 64 points along a single ray for importance sampling. The network was trained to minimize the rgb-loss and sparsity losses as in Eq. 9 and 22 with standard weights. The training comprised 5e5 steps using the Adam optimizer with a learning rate of 5e-4 decaying exponentially with a factor of 0.1 every 5e5 steps.

During inference, the underlying mesh was leveraged to sample points around tetrahedra hit by a single ray, therefore a single stage sampling with a total sample number of coarse added to importance sample points was used. When extracting the local volumetric features as in Eqs. 13-17 above, 20 neighbors were used.

Four subjects from the publicly available Multiface dataset were used for evaluation.

The peak signal to noise ratio, structural similarity index, and learned perceptual image patch similarity of the method described herein were 22.8982, 0.7954 and 0.2256 respectively for real data with casual expressions of subjects.

For synthetic data with novel, static expressions, the same parameters were 32.2900, 0.9882 and 0.0231 respectively.

An alternative architecture referred to as a baseline technology, without multiple radiance field parameterizations, trained on multiple frames, provided peak signal to noise ratio, structural similarity index, and learned perceptual image patch similarity of 22.4659, 0.7943, and 0.2449 for real data, and 30.2107, 0.9815 and 0.0387 for synthetic data respectively.

The method described herein outperforms the baseline technology and is able to render images in a controllable and interpretable manner for novel expressions. In various examples, it provides real-time photorealistic avatars capable of modelling fine expression detail beneficial in human communication.

Figure 9:
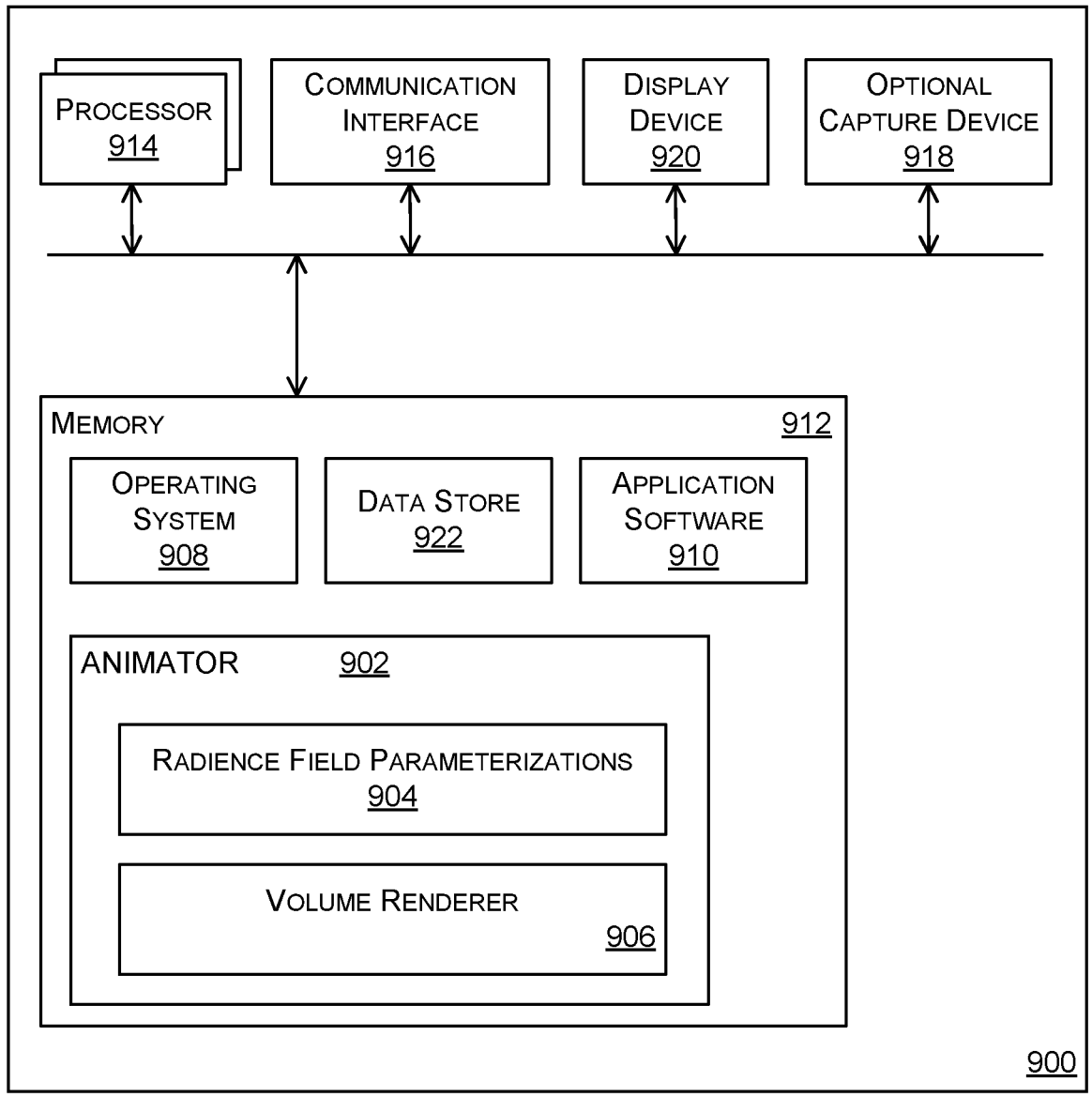
FIG. 9 illustrates an exemplary computing-based device in which embodiments of an animator for computing images of controllable dynamic scenes is implemented.

FIG. 9 illustrates various components of an exemplary computing-based device 900 which are implemented as any form of a computing and/or electronic device, and in which embodiments of an image animator are implemented in some examples.

Computing-based device 900 comprises one or more processors 914 which are microprocessors, controllers or any other suitable type of processors for processing computer executable instructions to control the operation of the device in order to generate synthetic images of a dynamic scene in a controllable manner. In some examples, for example where a system on a chip architecture is used, the processors 914 include one or more fixed function blocks (also referred to as accelerators) which implement a part of the method of any of FIGS. 4 to 8 in hardware (rather than software or firmware). Platform software comprising an operating system 908 or any other suitable platform software is provided at the computing-based device to enable application software 910 to be executed on the device. A data store 922 holds output images, values of face tracker parameters, values of physics engine rules, intrinsic camera parameter values, viewpoints and other data. An animator 902 comprising radiance field parameterizations 904 and a volume renderer 906 is present at the computing-based device 900.

The computer executable instructions are provided using any computer-readable media that is accessible by computing based device 900. Computer-readable media includes, for example, computer storage media such as memory 912 and communications media. Computer storage media, such as memory 912, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 912) is shown within the computing-based device 900 it will be appreciated that the storage is, in some examples, distributed or located remotely and accessed via a network or other communication link (e.g. using communication interface 916).

The computing-based device 900 has an optional capture device 918 to enable the device to capture sensor data such as images and videos. The computing-based device 900 has an optional display device 920 to display output images and/or values of parameters.

Alternatively or in addition to the other examples described herein, examples include any combination of the following clauses:

Clause A. A computer-implemented method of computing an image of a dynamic 3D scene comprising a 3D object, the method comprising: receiving a description of a deformation of the 3D object, the description comprising a cage of primitive 3D elements and associated animation data from a physics engine or an articulated object model; for a pixel of the image, computing a ray from a virtual camera through the pixel into the cage animated according to the animation data and computing a plurality of samples on the ray, each sample being a 3D position and view direction in one of the 3D elements; computing a transformation of the samples into a canonical version of the cage to produce transformed samples and local features describing the volume change between canonical and non-canonical states of the cage; for each transformed sample, querying a plurality of learnt radiance field parameterizations of the 3D scene, each learnt on a different deformed state of the scene, to obtain a color value from each learnt radiance field; for each transformed sample, querying a learnt radiance field parameterization of the 3D scene, to obtain an opacity value; computing, for each transformed sample, a weighted combination of the color values, where the weights are related to the local features; and applying a volume rendering method to the weighted combinations of the color values and the opacity values to produce a pixel value of the image.

Clause B. The method of clause A wherein the cage of primitive 3D elements represents the 3D object and a volume extending from the 3D object.

Clause C. The method of clause B wherein the cage comprises a volumetric mesh with a plurality of volumetric blendshapes and a skeleton.

Clause D. The method of clause A further comprising, for one of the transformed samples, rotating a view direction of a ray of the sample prior to querying the plurality of learnt radiance field parameterizations.

Clause E. The method of clause D comprising computing a rotation R of the view direction for a small fraction of the primitive 3D elements and propagating the value of R to remaining 3D elements via nearest neighbor interpolation.

Clause F. The method of any preceding clause wherein the canonical version of the cage is the cage with specified parameter values of an articulated object model or specified parameters of a physics engine.

Clause G. The method of any preceding clause wherein the canonical version of the cage represents a face with a neutral expression including a closed mouth.

Clause H. The method of any preceding clause wherein the weights are related to the local features by a softmax-gated local similarity measure that is equivalent to a vector field of the weights discretized on vertices of the cage, wherein the local similarity measure defines the difference between a local measure of volume between canonical and non-canonical states of the cage.

Clause I. The method of any preceding clause wherein the learnt radiance field parameterizations are each a cache of associations between 3D points in the canonical version of the cage and color and opacity values, obtained by querying a machine learning model trained using training data comprising images of the dynamic scene from a plurality of viewpoints.

Clause J. The method of clause I wherein the images of the dynamic scene from a plurality of viewpoints are obtained at the same time instance or two time instants.

Clause K. The method of clause wherein querying a learnt radiance field parameterization of the 3D scene to obtain an opacity value comprises querying a plurality of learnt radiance field parameterizations of the 3D scene, each learnt on a different deformed state of the scene, to obtain an opacity value from each learnt radiance field, and computing, for each transformed sample, a weighted combination of the opacity values, wherein the weights are related to the local features.

Clause L. The method of any preceding clause comprising, during the process of, for each transformed sample, querying each learnt radiance field parameterization of the plurality of learnt radiance field parameterizations of the 3D scene to obtain a color value and an opacity value, using only one radiance field network and increasing a number of sampling bins.

Clause M. The method of any preceding clause, wherein the primitive 3D elements are tetrahedra, and wherein the method further comprises computing the transformation P of a sample by setting P equal to a normalized distance between a previous and a next intersection of a tetrahedron on a ray, times the sum, at the previous intersection, over four vertices of a tetrahedron of a barycentric coordinate of a vertex times a canonical coordinate of the vertex, plus one minus the normalized distance, times the sum, at the next intersection, over four vertices of the tetrahedron of the barycentric coordinate of a vertex times the canonical coordinate of the vertex.

Clause N. An apparatus comprising: at least one processor; a memory storing instructions that, when executed by the at least one processor, perform a method for computing an image of a dynamic 3D scene comprising a 3D object, comprising: receiving a description of a deformation of the 3D object, the description comprising a cage of primitive 3D elements and associated animation data from a physics engine or an articulated object model; for a pixel of the image, computing a ray from a virtual camera through the pixel into the cage animated according to the animation data and computing a plurality of samples on the ray, each sample being a 3D position and view direction in one of the 3D elements; computing a transformation of the samples into a canonical version of the cage to produce transformed samples and local features describing the volume change between canonical and non-canonical states of the cage; for each transformed sample, querying a plurality of learnt radiance field parameterizations of the 3D scene, each learnt on a different deformed state of the scene, to obtain a color value from each learnt radiance field; for each transformed sample, querying a learnt radiance field parameterization of the 3D scene to obtain an opacity value; computing, for each transformed sample, a weighted combination of the color values, where the weights are related to the local features; and applying a volume rendering method to the weighted combinations of the color values and the opacity values to produce a pixel value of the image.

Clause O. A computer-implemented method of computing an image of a dynamic 3D scene comprising a 3D object, the method comprising: receive a description of a deformation of the 3D object; for a pixel of the image, computing a ray from a virtual camera through the pixel into the description and computing a plurality of samples on the ray, each sample being a 3D position and view direction in one of the 3D elements; compute a transformation of the samples into a canonical space to produce transformed samples and local features; for each transformed sample, query a plurality of caches of associations between 3D points in the canonical space and color values, each cache produced using images of a different deformed state of the scene; for each transformed sample, querying a cache of associations between 3D points in the canonical space and color and opacity values to obtain an opacity value; compute, for each transformed sample, a weighted combination of the color values, wherein the weights are related to the local features; and apply a volume rendering method to the weighted combinations of the color values and the opacity values to produce a pixel value of the image.

Clause P. The method of clause O further comprising one or more of storing the image, transmitting the image to a computer game application, transmitting the image to a telepresence application, inserting the image into a virtual webcam stream, transmitting the image to a head mounted display.

Clause Q. The method of clause O or P comprising using an object tracker to detect parameter values of a model of a 3D object depicted in a video and using the detected parameter values and the model to compute the description of the deformation of the 3D object.

Clause R. The method of any of clause O to Q comprising using a physics engine to specify the description.

Clause S. The method of any of clause O to R wherein the 3D primitive elements are any of: tetrahedra, spheres, cuboids.

Clause T. The method of any to clause Q to S wherein querying a learnt radiance field parameterization of the 3D scene to obtain an opacity value comprises querying a plurality of learnt radiance field parameterizations of the 3D scene, each learnt on a different deformed state of the scene, to obtain an opacity value from each learnt radiance field, and computing, for each transformed sample, a weighted combination of the opacity values, wherein the weights are related to the local features.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer-implemented method of computing an image of a dynamic 3D scene comprising a 3D object, the method comprising:
    receiving a description of a deformation of the 3D object, the description comprising a cage of primitive 3D elements and associated animation data from a physics engine or an articulated object model;
    for a pixel of the image, computing a ray from a virtual camera through the pixel into the cage animated according to the animation data and computing a plurality of samples on the ray, each sample being a 3D position and view direction in one of the 3D elements;
    computing a transformation of the samples into a canonical version of the cage to produce transformed samples and local features describing a volume change between canonical and non-canonical states of the cage;
    for each transformed sample, querying a plurality of learnt radiance field parameterizations of the 3D scene, each learnt on a different deformed state of the scene, to obtain a color value from each learnt radiance field;
    for each transformed sample, querying a learnt radiance field parameterization of the 3D scene to obtain an opacity value;
    computing, for each transformed sample, a weighted combination of the color values, wherein the weights are related to the local features; and
    applying a volume rendering method to the weighted combinations of the color values and the opacity values to produce a pixel value of the image.

2. The method of claim 1 wherein the cage of primitive 3D elements represents the 3D object and a volume extending from the 3D object.

3. The method of claim 2 wherein the cage comprises a volumetric mesh with a plurality of volumetric blendshapes and a skeleton.

4. The method of claim 1 further comprising, for one of the transformed samples, rotating a view direction of a ray of the sample prior to querying the plurality of learnt radiance field parameterizations.

5. The method of claim 4 comprising computing a rotation R of the view direction for a small fraction of the primitive 3D elements and propagating the value of R to remaining primitive 3D elements via nearest neighbor interpolation.

6. The method of claim 1 wherein the canonical version of the cage is the cage with specified parameter values of an articulated object model or specified parameters of a physics engine.

7. The method of claim 1 wherein the canonical version of the cage represents a face with a neutral expression including a closed mouth.

8. The method of claim 1 wherein the weights are related to the local features by a softmax-gated local similarity measure that is equivalent to a vector field of the weights discretized on vertices of the cage, wherein the local similarity measure defines the difference between a local measure of volume between canonical and non-canonical states of the cage.

9. The method of claim 1 wherein the learnt radiance field parameterizations are each a cache of associations between 3D points in the canonical version of the cage and color and opacity values, obtained by querying a machine learning model trained using training data comprising images of the dynamic scene from a plurality of viewpoints.

10. The method of claim 9 wherein the images of the dynamic scene from a plurality of viewpoints are obtained at the same time instance or two time instants.

11. The method of claim 1 wherein querying a learnt radiance field parameterization of the 3D scene to obtain an opacity value comprises querying a plurality of learnt radiance field parameterizations of the 3D scene, each learnt on a different deformed state of the scene, to obtain an opacity value from each learnt radiance field, and computing, for each transformed sample, a weighted combination of the opacity values, wherein the weights are related to the local features.

12. The method of claim 1 comprising, during the process of, for each transformed sample, querying each learnt radiance field parameterization of the plurality of learnt radiance field parameterizations of the 3D scene to obtain a color value and an opacity value, using only one radiance field network and increasing a number of sampling bins.

13. The method of claim 1 wherein the primitive 3D elements are tetrahedra, and wherein the method further comprises computing the transformation P of a sample by setting P equal to a normalized distance between a previous and a next intersection of a tetrahedron on a ray, times a sum, at the previous intersection, over four vertices of a tetrahedron of a barycentric coordinate of a vertex times a canonical coordinate of the vertex, plus one minus the normalized distance, times a sum, at the next intersection, over four vertices of the tetrahedron of the barycentric coordinate of a vertex times the canonical coordinate of the vertex.

14. An apparatus comprising: at least one processor; and a memory storing instructions that, when executed by the at least one processor, perform a method for computing an image of a dynamic 3D scene comprising a 3D object, comprising:
receiving a description of a deformation of the 3D object, the description comprising a cage of primitive 3D elements and associated animation data from a physics engine or an articulated object model;
for a pixel of the image, computing a ray from a virtual camera through the pixel into the cage animated according to the animation data and computing a plurality of samples on the ray, each sample being a 3D position and view direction in one of the 3D elements;
computing a transformation of the samples into a canonical version of the cage to produce transformed samples and local features describing a volume change between canonical and non-canonical states of the cage;
for each transformed sample, querying a plurality of learnt radiance field parameterizations of the 3D scene, each learnt on a different deformed state of the scene, to obtain a color value from each learnt radiance field;
for each transformed sample, querying a learnt radiance field parameterization of the 3D scene to obtain an opacity value;
computing, for each transformed sample, a weighted combination of the color values, wherein the weights are related to the local features; and
applying a volume rendering method to the weighted combinations of the color values and the opacity values to produce a pixel value of the image.

15. A computer-implemented method of computing an image of a dynamic 3D scene comprising a 3D object, the method comprising:
receive a description of a deformation of the 3D object, the description comprising 3D elements;
for a pixel of the image, computing a ray from a virtual camera through the pixel into the description and computing a plurality of samples on the ray, each sample being a 3D position and view direction in one of the 3D elements;
compute a transformation of the samples into a canonical space to produce transformed samples and local features;
for each transformed sample, query a plurality of caches of associations between 3D points in the canonical space and color and opacity values to obtain color values, each cache produced using images of a different deformed state of the scene;
for each transformed sample, querying a cache of associations between 3D points in the canonical space and color and opacity values to obtain an opacity value;
compute, for each transformed sample, a weighted combination of the color values, wherein the weights are related to the local features; and
apply a volume rendering method to the weighted combinations of the color values and the opacity values to produce a pixel value of the image.

16. The method of claim 15 further comprising one or more of: storing the image, transmitting the image to a computer game application, transmitting the image to a telepresence application, inserting the image into a virtual webcam stream, transmitting the image to a head mounted display.

17. The method of claim 16 comprising using an object tracker to detect parameter values of a model of a 3D object depicted in a video and using the detected parameter values and the model to compute the description of the deformation of the 3D object.

18. The method of claim 16 comprising using a physics engine to specify the description.

19. The method of claim 16 wherein the 3D elements are any of: tetrahedra, spheres, cuboids.

20. The method of claim 16 wherein querying a learnt radiance field parameterization of the 3D scene to obtain an opacity value comprises querying a plurality of learnt radiance field parameterizations of the 3D scene, each learnt on a different deformed state of the scene, to obtain an opacity value from each learnt radiance field, and computing, for each transformed sample, a weighted combination of the opacity values, wherein the weights are related to the local features.

* * * * *